US011453576B2

(12) United States Patent
Svinth

(10) Patent No.: US 11,453,576 B2
(45) Date of Patent: Sep. 27, 2022

(54) SYSTEM, DEVICE AND METHOD FOR LIFTING AND CONTROLLING THE HORIZONTAL ORIENTATION AND/OR POSITION OF COMPONENTS

(71) Applicant: Eltronic Wind Solutions A/S, Hedensted (DK)

(72) Inventor: Kenneth Helligsø Svinth, Galten (DK)

(73) Assignee: ENABL A/S, Hedensted (DK)

( * ) Notice: Subject to any disclaimer, the term of this patent is extended or adjusted under 35 U.S.C. 154(b) by 364 days.

(21) Appl. No.: 16/771,783

(22) PCT Filed: Dec. 10, 2018

(86) PCT No.: PCT/DK2018/050340
§ 371 (c)(1),
(2) Date: Jun. 11, 2020

(87) PCT Pub. No.: WO2019/114898
PCT Pub. Date: Jun. 20, 2019

(65) Prior Publication Data
US 2021/0362987 A1  Nov. 25, 2021

(30) Foreign Application Priority Data

Dec. 13, 2017  (DK) .......................... PA 2017 70934
Dec. 21, 2017  (DK) .......................... PA 2017 70976

(51) Int. Cl.
B66C 1/10    (2006.01)
B66C 13/08   (2006.01)
(Continued)

(52) U.S. Cl.
CPC .............. B66C 13/08 (2013.01); B66C 1/108 (2013.01); B66C 23/185 (2013.01); F03D 13/10 (2016.05); F05B 2230/61 (2013.01)

(58) Field of Classification Search
CPC ...... F05B 2230/61; F03D 13/10; B66C 1/101; B66C 1/108; B66C 13/08; B66C 23/185
See application file for complete search history.

(56) References Cited

FOREIGN PATENT DOCUMENTS

CN    106865415 A    6/2017
EP      2364949 A1    9/2011
(Continued)

Primary Examiner — Moshe Wilensky
(74) Attorney, Agent, or Firm — Cermak Nakajima & McGowan LLP; James Creighton Wray

(57) ABSTRACT

The system (1) for lifting and controlling the horizontal orientation and/or position of components (90), such as wind turbine main components, during installation and/or dismounting of said components comprises: a crane boom arrangement (3) and one or more lifting lines (3a) guided by said crane boom arrangement (3) for lifting said components. The system moreover comprises a lifting device (10) comprising a crane connection arrangement (11) connected to said one or more lifting lines (3a), a frame arrangement (12) connected to said crane connection arrangement (11), a first and a second steering wire guide (13a, 13b) configured for guiding steering wires (20a, 20b), and a component connection arrangement (30) connected to said frame arrangement and configured to be connected directly or indirectly to the component to be lifted. The system (1) further comprises a guiding arrangement (4) connected to said crane boom arrangement (3), and said steering wires (20a, 20b) are connected to said guiding arrangement (4) and extend from the guiding arrangement (4) in a direction towards the lifting device (10) with a mutual angle (a1) between the steering wires (20a, 20b). A relative displacement between said frame arrangement (12) and one or both of the first and second steering wire guides (13a, 13b) is configured to be provided to control the mutual angle (a1) between the steering wires (20a, 20b).

11 Claims, 13 Drawing Sheets

(51) Int. Cl.
*F03D 13/10* (2016.01)
*B66C 23/18* (2006.01)

(56) References Cited

FOREIGN PATENT DOCUMENTS

| | | | |
|---|---|---|---|
| EP | 2889251 | A1 | 7/2015 |
| EP | 31565493 | A1 | 5/2017 |
| JP | S58197 | A | 11/1983 |
| JP | 2013186903 | A | 9/2013 |
| KR | 20110123929 | A | 11/2011 |
| WO | 9420403 | A1 | 9/1994 |
| WO | 03100249 | A1 | 12/2003 |
| WO | 2008061797 | A1 | 5/2008 |

SYSTEM, DEVICE AND METHOD FOR LIFTING AND CONTROLLING THE HORIZONTAL ORIENTATION AND/OR POSITION OF COMPONENTS

This application claims the benefit of Danish Application No. PA 2017 70934 filed Dec. 13, 2017, Danish Application No. PA 2017 70976 filed Dec. 21, 2017 and PCT/DK2018/050340 filed Dec. 10, 2018, International Publication No. WO 2019/114898 A1, and the amended sheets from the IPRP, which are hereby incorporated by reference in their entirety as if fully set forth herein.

The invention relates to a system for lifting and controlling the horizontal orientation and/or position of components, such as wind turbine main components, a lifting device, and a method

BACKGROUND

Components such as wind turbine main components get larger and/or heavier, and wind turbines continue to get taller. This provides a need for solutions for mounting and dismounting such components.

WO 2008/061797 discloses a system for mounting wind turbine blades wherein the system comprises a crane with a lifting wire fixed to a yoke. The system moreover comprises control wires which are fixed to the yoke and guiding ropes respectively, and the control wires are configured to run over pulleys of a sliding carriage which can be moved along the crane boom.

JP 6156975A discloses assistance wires extending horizontally and connected to each their guide wire. The assistance wires are connected to cargo lifted by a crane, and moves vertically along the guide wires together with the cargo.

It is also known to adjust the horizontal orientation of components by means of manually pulling steering/assistance wires connected to a component to be lifted.

The above solutions suffer from drawbacks which the present invention may reduce or even avoid. For example, the above solutions may induce unwanted forces at a crane arrangement used for lifting the components.

The present invention provides advantages with regards to lifting and controlling the horizontal orientation of components, such as wind turbine main components, during installation and/or dismounting of said components. For example, the present invention may provide advantages with regard to avoiding or reducing unwanted forces at a crane arrangement lifting the components and/or advantages with regard to controlling the horizontal orientation and/or position of lifted components.

THE INVENTION

The invention relates to a system for lifting and controlling the horizontal orientation and/or position of components, such as wind turbine main components, during installation and/or dismounting of said components. The system may comprise one or more of a crane boom arrangement and one or more lifting lines guided by said crane boom arrangement for lifting said components,
  a lifting device comprising
  a crane connection arrangement connected to said one or more lifting lines,
  a frame arrangement connected to said crane connection arrangement,
  a first and a second steering wire guide configured for guiding steering wires connected to and supported by said frame arrangement, and
  a component connection arrangement connected to said frame arrangement and configured to be connected directly or indirectly to the component to be lifted,
wherein the system further comprises a rotation control arrangement configured to adjust the orientation in a horizontal plane of a component lifted by means of said lifting device by adjusting one or more of said steering wires, and
  a guiding arrangement connected to said crane boom arrangement, wherein said steering wires are connected to said guiding arrangement and extend from the guiding arrangement in a direction towards the lifting device with a mutual angle between the steering wires,
  wherein a relative displacement between said frame arrangement and one or both of the first and second steering wire guides is configured to be provided to control the mutual angle between the steering wires.

The present system may e.g. solve problems that may occur when lifting and controlling the horizontal orientation and/or position of components, such as wind turbine main components, during e.g. installation and/or dismounting of such components.

When handling such components, it is may be necessary to be able to provide a suitable rotation in the horizontal plane of the component while it hangs from the lifting line(s), in order to enable proper installation at the wind turbine at the correct position and/or to enable proper positioning at a support position at e.g. the ground, at a transportation vehicle, at a vessel such as a ship and/or the like. It may also be relevant to be able to rotating the frame arrangement and thus provide a desired horizontal orientation of the lifting device/frame arrangement when connecting components to the frame arrangement one way or the other either during installation and/or dismounting of components.

The present invention thus provides an advantageous and safe solution for controlling the horizontal orientation and position of components which may be provided without the need of manual/human induced forces on the component by manually operated steering wires.

Generally, when adjusting the distance between the lifting device and the crane boom or guiding arrangement, e.g. by altering the angle/position of parts of the crane and adjustment of the steering wires by winding and/or unwinding both may be needed.

An adjustment of the distance between the lifting device and the crane boom or guiding arrangement may also cause a change in angle between the steering wires extending towards the lifting device. The angle will as, a general rule, reduce, and e.g. tend to move towards a more acute angle, as the lifting device is moved further away from the crane arrangement. Correspondingly, when moving the lifting device and thus the component to be lifted, closer to the crane boom, the angle will increase of not adjusted. This may reduce the control of the horizontal orientation of the lifting device and/or reducing the possible rotation range of the frame arrangement/lifted component.

However, when providing a relative displacement between the frame arrangement and one or more of the first and second steering wire to control the mutual angle between the steering wires when the frame arrangement is rotated in the horizontal plane, this may e.g. provide an improved operational range of the system and/or an improved control of the horizontal orientation of the component to be lifted, e.g. to be able to keep the component sufficiently still/steady.

The present invention may moreover help to provide a space saving control of the angle between the steering wires, as the control is provided at/by the lifting device.

Generally, it is understood that the first and second steering wire guides may also be referred to as "steering line guides", and/or that the first and second steering wire guides may be configured to/arranged to guide steering wires/lines/ropes made from e.g. metal, such as steel and/or from a polymer material such as Polyethylene, e.g. Ultra-High Molecular Weight Polyethylene (UHMwPE).

In preferred aspects of the invention, the rotation control arrangement may be configured to adjust said one or more of said steering wires to rotate the frame arrangement in the horizontal plane, and wherein said relative displacement between the frame arrangement and one or both of the first and second steering wire guides is configured to be provided to control the mutual angle between the steering wires when said frame arrangement is rotated in a horizontal plane.

When rotating the component connected to the frame arrangement, this will change the angle between the steering wires. The available frame rotation range may e.g. depend on the angle between the steering wires, as a too acute angle may increase the risk of an unwanted continuation of the rotation of the component and thus risk that the control of the horizontal orientation of the component is lost. This may be dangerous to humans nearby and/or cause a risk of severe damage to nearby structures. However, by controlling the angle between the steering wires/lines, this may cause an enhanced control during rotation of the frame arrangement in a horizontal plane.

In advantageous aspects of the invention, said first and a second steering wire guides may be connected to and supported by said frame arrangement, and one or both of the first and second steering wire guides may be configured to be displaced relative to said frame arrangement to control said mutual angle between the steering wires.

This may provide a space saving solution, as e.g. structures of the lifting device that are kept in a fixed position during the rotation of the frame arrangement and supporting the steering wire guides may be omitted. Moreover it may be an advantageous solution with respect to simplicity and control of the rather large forces that may be induced during the rotation of the component to be lifted.

Additionally, it may cause an advantageous solution which may enable an active control of the angle between the steering wires in response to rotation of the frame arrangement and/or when moving the lifting device away from and/or toward the guiding arrangement and/or the crane boom arrangement.

Advantageously, in aspects of the invention said first and/or second steering wire guides may be configured to provide that the angle between the steering wires/lines is within an angle range between 50° and 130°, preferably between 60° and 120°, such as between 75° and 105°, preferably between 85° and 95° when the frame arrangement is rotated.

This angle may e.g., in aspects of the invention, be configured to be kept within said angle range, within a frame rotation range of ±60° such as within a frame rotation range of ±50° e.g. within a frame rotation range of about ±40°.

The angle between the steering wires may in embodiments of the invention be controlled by adjusting the mutual distance between the first and second steering wire guides.

This may provide a preferred solution which may e.g. be space saving. Moreover, it may provide an advantageous solution which may enable an active control of the angle between the steering wires in response to rotation of the frame arrangement and/or in response to moving the lifting device away from and/or toward the guiding arrangement and/or the crane boom arrangement.

In preferred aspects of the invention, one or both of the first and second steering wire guides are configured to be displaced towards and/or away from a centre part of the lifting device so as to control said mutual angle between the steering wires, preferably based on control signals from a displacement control system.

In preferred aspects of the invention, the mutual distance between the first and second steering wire guides may be:
configured to be increased in response to an increase in the distance between the crane boom arrangement and/or guiding arrangement, and the lifting device,
configured to be reduced in response to a decrease in the distance between the crane boom arrangement and/or guiding arrangement and the lifting device, and/or
configured to be adjusted in response to a rotation of the frame arrangement.

This may generally help to provide a more safe solution and/or a solution with improved operational ranges/capabilities. It may also help to provide an advantageous solution for controlling the angle between the steering wires to e.g. be able to keep the lifted component and/or the lifting device still/steady.

In preferred aspects of the invention, the first and second steering wire guides may be configured to be displaced along a longitudinal frame part of said frame arrangement, where said longitudinal frame parts are configured to extend in a direction away from a centre part of said lifting device, preferably in a substantially horizontal direction, when the lifting device hangs from said one or more lifting lines.

In advantageous aspects of the invention, each of said steering wires may be configured to be guided at said lifting device by at least one further steering wire guide, such as a pulley, and wherein said first and/or second steering wire guides may be configured to be displaced relative to said at least one further steering wire guide.

In preferred aspects of the invention, said first and second steering wire guides may be configured to provide guiding points for said steering wires at a guiding position between said guiding arrangement and a steering wire connection at said lifting device.

In preferred aspects of the invention, each of said steering wires extend from said guiding arrangement and over the first or second steering wire guide respectively, and therefrom over at least one further steering wire guide before it is connected to a steering wire connection such as a winch arrangement.

Preferably, in aspects of the invention, said steering wires/lines/ropes may be made from metal, such as steel and/or from a polymer material such as Polyethylene, e.g. Ultra-High Molecular Weight Polyethylene (UHMwPE).

In aspects of the invention said guiding arrangement may comprise one or more guiding wires extending in a longitudinal direction of a crane boom of said crane boom arrangement.

Said guiding arrangement may preferably, in aspects of the invention, comprise a single guiding wire, wherein both of said steering wires are preferably connected to said single guiding wire by means of a connection.

Such "single guiding wire" solutions may provide advantages in relation to reducing and/or avoiding undesired forces acting on the crane arrangement. The present invention may be especially advantageous in such systems having a "single guiding wire" solution, as such solutions may however cause increased challenges when controlling/keeping a desired angle between the steering wires, since the "point of connection" for the steering wires is substantially one point and not distributed between e.g. two separate guiding wires arranged with an intermediate distance.

Preferably, each of said first and second steering wire guides comprises one or more pulleys for supporting and guiding said steering wires.

In preferred aspects of the invention, said system comprises a displacement control system for controlling the displacement of one or more of the first and/or second steering wire guides relative to said frame arrangement, wherein said displacement control system comprises:
- one or more displacement arrangements arranged at said lifting device and configured to provide a displacement of the respective, steering wire guide relative to the frame arrangement, and
- a displacement arrangement controller comprising control circuitry configured to provide control signals to the displacement arrangements, preferably based on one or more input signals/control signals.

Such a displacement control system may help to provide an advantageous, active control of the for controlling the displacement of one or more of the first and second steering wire guides relative to said frame arrangement in order to keep the desired angle between the steering wires when lifting, changing position and/or orientation of components.

The displacement control system may in preferred aspects of the invention be configured to provide a displacement of said first and/or second steering wire guides in response to an adjustment of one or more of said steering wires by means of the rotation control arrangement.

The adjustment of one or more of said steering wires by means of the rotation control arrangement may in advantageous aspects of the invention be configured to be provided by winding or unwinding said steering wires by means of the rotation control arrangement.

The lifting device may in preferred aspects of the invention comprise one or more displacement arrangements configured to provide a displacement of the respective, steering wire guide relative to the frame arrangement, wherein said displacement arrangements preferably, in further aspects of the invention may comprise a threaded spindle and nut arrangement, a chain arrangement and/or a linear actuator.

This may cause advantageous control of the displacement of the respective, steering wire guide relative to the frame arrangement.

The frame arrangement may in aspects of the invention be rotatable connected to said crane connection arrangement. In other advantageous aspects of the invention, rotation in the horizontal plane be facilitated by a rotatable connection at e.g. a crane hook arrangement or the like connecting the one or more lifting lines to the crane connection arrangement, or at another part arranged between the frame arrangement and the lifting line(s), in order to e.g. avoid or reduce a twisting of the one or more lifting lines when the frame arrangement is rotated in the horizontal plane by adjusting the steering wires/lines/ropes.

This may e.g. be advantageous as it may e.g. help to provide an advantageous frame rotation range, and/or it may help to reduce a rotation/twisting of one or more lifting wires around a vertical axis when rotating the frame arrangement.

The relative displacement between one or both of the first and second steering wire guides and said frame arrangement may in advantageous aspects of the invention be configured to be provided due to and/or in repose to said rotation of the frame arrangement, thereby providing the control of the mutual angle between the steering wires when said frame arrangement is rotated in the horizontal plane.

The lifting device may in preferred aspects of the invention comprise said rotation control arrangement, and where said rotation control arrangement comprises one or more winch arrangements arranged to wind and unwind one or more of the steering wire(s)/lines.

It may be desired to arrange the rotation control arrangement at the lifting device as it may e.g. help to reduce unwanted forces acting on the crane arrangement during rotation compared to e.g. solutions where the rotation control arrangement is arranged at the bottom of the crane.

In other aspects of the invention, however, the rotation control arrangement may be arranged separate to the lifting device, preferably at the crane comprising the crane boom arrangement, such as at the lower part of the crane.

Said first and second steering wire guides may in preferred aspects of the invention be arranged spaced apart at opposite sides of said frame arrangement.

In advantageous aspects of the invention, the first steering wire guide may be arranged at a first side of a centre part of said frame arrangement, and said second steering wire guide may be arranged at second, opposite side of said centre frame part, wherein said rotation control arrangement is configured to provide a rotation of said frame arrangement so that one of said sides is moved in a direction away from the crane boom arrangement while the other of said sides is moved in a direction towards the crane boom arrangement, wherein said displacement control system is configured to provide a displacement of the steering wire guide arranged at the side moving away from the crane boom arrangement in a direction towards said centre part, and/or wherein said displacement control system is configured to provide a displacement of the steering wire guide arranged at the side moving towards the crane boom arrangement in a direction away from or towards said centre part.

Said main components may in preferred aspects of the invention comprise one or more of:
- wind turbine blades,
- wind turbine tower sections,
- wind turbine nacelle,
- wind turbine hub, and/or
- a generator and/or gear box for a wind turbine to be arranged in or removed from said nacelle The invention moreover, in a second aspect, relates to a lifting device for lifting, and controlling the horizontal orientation of components, such as wind turbine main components, during installation and/or dismounting of said components, wherein the lifting device may comprise one or more of:
- a crane connection arrangement configured to be connected to one or more lifting lines of a crane arrangement,
- a frame arrangement connected to said crane connection arrangement,
- a first and a second steering wire guide for guiding steering wires connected to and supported by said frame arrangement, and
- a component connection arrangement connected to said frame arrangement and configured to be connected directly or indirectly to the component to be lifted,
wherein a relative displacement between said frame arrangement and one or both of the first and second steering wire guides is configured to be provided to control the mutual angle between the steering wires.

Generally, it is to be understood that the lifting device according to the second aspect described above and/or below may e.g. provide or help to provide e.g. the advantages described above with respect to the system.

In preferred aspects of the second aspect of the invention, said relative displacement between one or both of the first and second steering wire guides and said frame arrangement is configured to be provided when said frame arrangement is rotated in the horizontal plane by means of a rotation control arrangement provided by adjusting one or more steering wires guided by said steering wire guides and when the lifting device hangs from the one or more lifting lines.

In advantageous aspects of the second aspect of the invention, the first and second steering wire guides may be configured to be displaced along frame parts, of said frame arrangement, where said frame parts are configured to extend in a direction away from a centre part of said lifting device, preferably in a substantially horizontal direction, when the lifting device hangs from said one or more lifting lines.

In advantageous aspects of the second aspect of the invention, the lifting device comprises a rotation control arrangement configured to adjust the orientation in the horizontal plane of a component lifted by means of said lifting device. These may preferably comprise one or more winches.

In advantageous aspects of the second aspect of the invention, the lifting device comprises one or more displacement arrangements configured to provide a displacement of the respective, steering wire guide relative to the frame arrangement. Said displacement arrangements preferably comprise a threaded spindle and nut arrangement, a chain arrangement and/or a linear actuator.

Advantageously, in aspects of the second aspect of the invention, the lifting device comprises a displacement arrangement controller comprising control circuitry configured to provide control signals to the displacement arrangements, preferably based on one or more input signals.

Generally, it is to be understood that the angle a1 between wires/lines to be controlled may, in aspects of the invention, be determined by e.g. a control arrangement based on the distance between the first and second steering wire guides, the orientation of the frame arrangement in the horizontal plane (due to the rotation in the horizontal plane) and/or the distance between the lifting device and the guiding arrangement or crane boom arrangement. One or more of these may be determined/represented/provided by means of a sensor arrangement providing input to the control arrangement.

In aspects of the second aspect of the invention, said frame arrangement may be rotatable connected to said crane connection arrangement. In other aspects, it may be a fixed connection, and the rotation may e.g. be facilitated by e.g. another connection between the frame arrangement and the lifting line(s).

In advantageous aspects of the second aspect of the invention, one or both of the first and second steering wire guides may be configured to be displaced relative to a centre part of said lifting device to control the mutual angle between the steering wires dependent on the rotation of said frame arrangement.

Advantageously, in aspects of the second aspect of the invention, said first and/or second steering wire guides, when guiding said steering wires may be configured to provide that the angle between the steering wires is within an angle range between 50° and 130°, preferably between 60° and 120°, such as between 75° and 105°, preferably between 85° and 95° when the frame arrangement is rotated.

This angle may in further aspects of the second aspect of the invention, be configured to be kept within said angle range within a frame rotation range of ±60° such as within a frame rotation range of ±50°, e.g. within a frame rotation range of about ±40°.

Advantageously, in preferred aspects of the second aspect of the invention, the angle between the steering wires is configured to be controlled by adjusting the mutual distance between the first and second steering wire guides.

Advantageously, in aspects of the second aspect of the invention, one or both of the first and second steering wire guides may be configured to be displaced towards and/or away from a centre part of said lifting device so as to control said mutual angle, preferably based on control signals from a displacement control system.

The lifting device may, in aspects of the second aspect of the invention, comprises further steering wire guides, such as pulleys, for guiding said steering wires. Said first and/or second steering wire guides may preferably be configured to be displaced relative to said at least one further steering wire guide 14a, 14b.

Advantageously, in aspects of the second aspect of the invention, said first and second steering wire guides may be configured to provide guiding points for said steering wires at a guiding position between said guiding arrangement and a steering wire connection at said lifting device.

Preferably, in aspects of the second aspect of the invention, each of said first and second steering wire guides may comprise pulleys for supporting and guiding said steering wires.

In aspects of the second aspect of the invention, said lifting device may comprise a displacement control system for controlling the displacement of one or more of the first steering wire guides relative to said frame arrangement. This displacement control system may preferably at least comprise:

one or more displacement arrangements arranged at said lifting device and configured to provide a displacement of the respective, steering wire guide relative to the frame arrangement, and preferably a displacement arrangement controller comprising control circuitry configured to provide control signals to the displacement arrangements, preferably based on one or more input signals.

Advantageously, in aspects of the second aspect of the invention, said displacement control system may be configured to provide a displacement of said first and/or second steering wire guides in response to an adjustment of one or more of said steering wires by means of the rotation control arrangement.

The relative displacement between one or both of the first and second steering wire guides and said frame arrangement may in advantageous aspects be configured to be provided by or in response to winding or unwinding said steering wires by means of said rotation control arrangement.

Advantageously, in aspects of the second aspect of the invention, said lifting device comprises one or more displacement arrangements configured to provide a displacement of the respective, steering wire guide relative to the frame arrangement, wherein said displacement arrangements preferably comprises a threaded spindle and nut arrangement, a chain arrangement and/or a linear actuator.

Advantageously, in aspects of the second aspect of the invention, said device may comprise said rotation control arrangement, and said rotation control arrangement may comprise one or more winch arrangements arranged to wind and unwind one or more of the steering wire(s).

Advantageously, in aspects of the second aspect of the invention, said first steering wire guide may be arranged at a first side of a centre part of said frame arrangement, and said second steering wire guide may be arranged at second, opposite side of said centre frame part. The rotation control arrangement may be configured to provide a rotation of said frame arrangement around a substantially vertical axis when the lifting device hangs from said one or more lifting lines, so that one of said sides is moved in a direction away from the crane boom arrangement while the other of said sides is moved in a direction towards the crane boom arrangement. A displacement control system may thus be configured to provide a displacement of the steering wire guide arranged at the side moving away from the crane boom arrangement in a direction towards said centre part, and/or the displacement control system may be configured to provide a displacement of the steering wire guide arranged at the side moving towards the crane boom arrangement in a direction away from or towards said centre part.

In preferred aspects of the second aspect of the invention The lifting device according to one or more of the aspects according to the second aspect of the invention, such as according to any of claims 25-46, may be for utilization in a system according to any of claims 1-24.

The invention further relates, in a third aspect, to a method of lifting and controlling the horizontal orientation and/or position of components, such as wind turbine main components, during installation and/or dismounting of said components. This may be provided by a a lifting device, wherein the lifting device comprising one or more of:
- a crane connection arrangement to be connected to one or more lifting lines of a crane arrangement,
- a frame arrangement connected to said crane connection arrangement,
- a first and a second steering wire guide for guiding steering wires connected to and supported by said frame arrangement, and
- a component connection arrangement connected to said frame arrangement and configured to be connected directly or indirectly to the component to be lifted.

In accordance with the third aspect, a guiding arrangement may be connected to a crane boom arrangement of the crane arrangement, and said steering wires are connected to said guiding arrangement and extend from the guiding arrangement in a direction towards the lifting device with a mutual angle between the steering wires, and so that the steering wires are guided by said first and second steering wire guides. The method may comprise the steps of:
- connecting one or more lifting lines to the crane connection arrangement so that the lifting device hangs from the one or more lifting lines,
- connecting a component to be lifted to said component connection arrangement,
- hoisting and/or lowering said component by operating said one or more lifting lines, and/or rotating the frame arrangement in a horizontal plane by means of said one or more steering wires guided by the steering wire guides, wherein a relative displacement between said frame arrangement and one or both of the first and second steering wire guides is provided due to and/or in repose to a rotation of the frame arrangement by a rotation control arrangement, and/or wherein a relative displacement between one or both of the first and second steering wire guides and said frame arrangement is provided in response to a change in distance between the lifting device and the guiding arrangement.

This may e.g. provide the advantages as described above in relation to the first and/or second aspects. Generally, it is to be understood that the lifting device may e.g. provide or help to provide e.g. the advantages described above with respect to the system and/or lifting device.

In preferred aspects of the method, the lifting device comprises one or more displacement arrangements providing a displacement of the respective, steering wire guide relative to the frame arrangement, wherein said displacement arrangements preferably comprises a threaded spindle and nut arrangement, a chain arrangement and/or a linear actuator.

In preferred aspects of the method, a displacement arrangement controller, e.g. arranged at the lifting device, comprises control circuitry providing control signals to the displacement arrangements, preferably based on one or more input signals.

In preferred aspects of the method, said main components comprises one or more of:
- wind turbine blades,
- wind turbine tower sections,
- wind turbine nacelle,
- wind turbine hub, and/or
- a generator and/or gear box for a wind turbine to be arranged in or removed from said nacelle In preferred aspects of the method, said first steering wire guide is arranged at a first side of a centre part of said frame arrangement, and said second steering wire guide is arranged at second, opposite side of said centre frame part, wherein said rotation control arrangement provides a rotation of said frame arrangement in the horizontal plane, e.g. around a substantially vertical axis, when the lifting device hangs from said one or more lifting lines, so that one of said sides is moved in a direction away from the crane boom arrangement while the other of said sides is moved in a direction towards the crane boom arrangement, wherein a displacement of the steering wire guide arranged at the side moving away from the crane boom arrangement is provided in a direction towards said centre part, and/or wherein said displacement control system provides a displacement of the steering wire guide arranged at the side moving towards the crane boom arrangement in a direction away from or towards said centre part.

In preferred aspects of the method, the mutual distance between the first and second steering wire guides is:
- increased in response to an increase in the distance between the crane boom arrangement and/or guiding arrangement, and the lifting device,
- reduced in response to a decrease in the distance between the crane boom arrangement and/or guiding arrangement and the lifting device, and/or
- adjusted in response to a rotation of the frame arrangement.

In preferred aspects of the method, said method is provided by means of a system according to any of claims 1-24 and/or a lifting device according to any of claims 25-47.

BRIEF DESCRIPTION OF THE DRAWINGS

Figures

Aspects of the present disclosure will be described in the following with reference to the figures in which.

DETAILED DESCRIPTION

Figure 1:
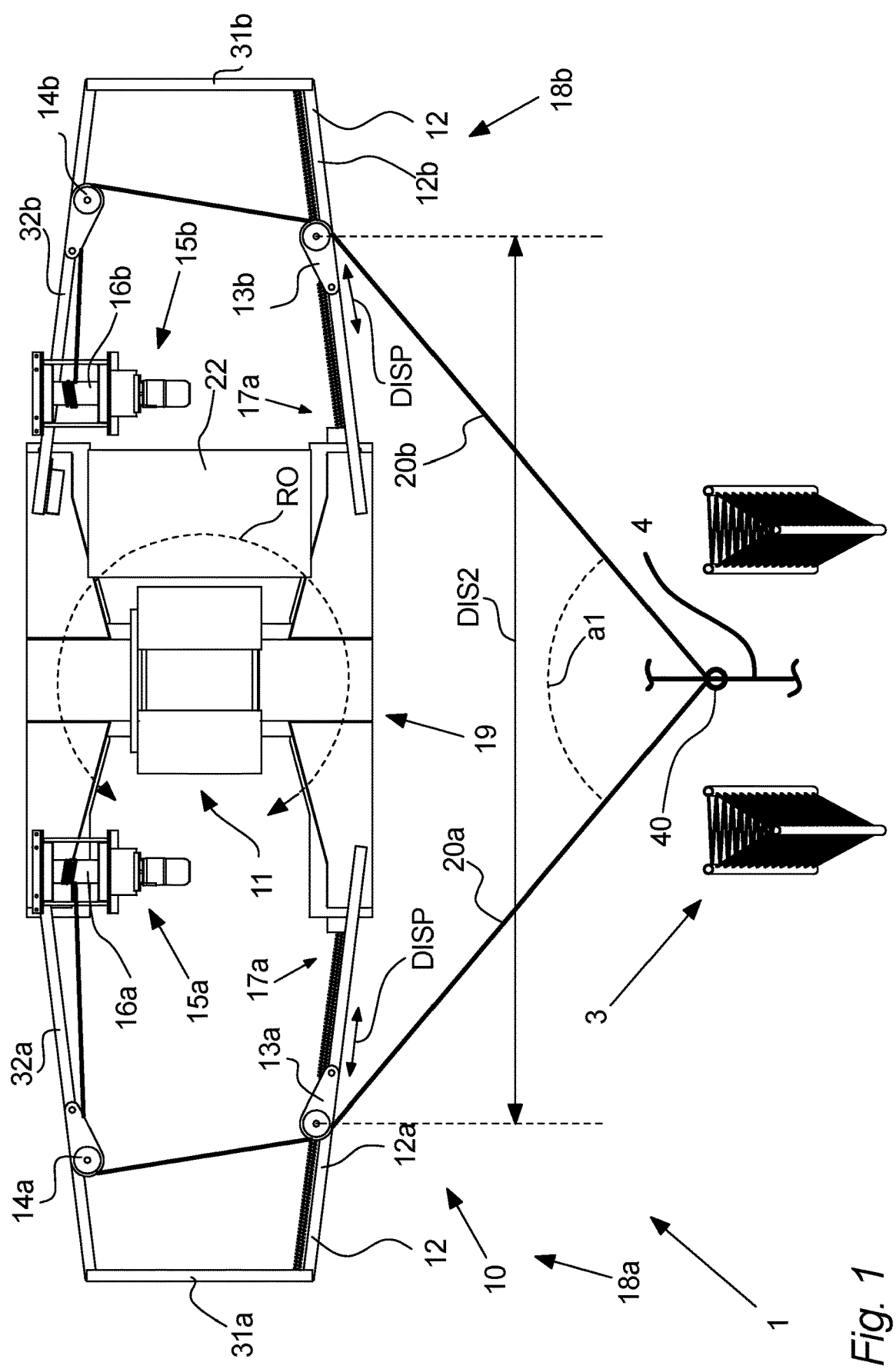
FIG. 1: illustrates a lifting system comprising a lifting device according to embodiments of the invention.

FIG. 1 illustrates schematically a system 1 for lifting and controlling the horizontal orientation of components, such as wind turbine main components, during installation and/or dismounting of said components. The component to be lifted by means of the lifting device 10 is not illustrated in FIG. 1. These main components may e.g. comprise one or more of wind turbine blades, wind turbine tower sections, wind turbine nacelle, wind turbine hub, and/or a generator and/or gear box for a wind turbine. These components may in embodiments of the invention be installed/arranged at the wind turbine structure during installation of and/or service on the wind turbine, and/or may be dismounted by means of the system 1.

The weight of the component(s) to be lifted by means of the lifting device 10 may in embodiments of the invention lie within 15 ton and 1500 ton, such as within 30 ton-700 ton, e-g- within 75 ton to 600 ton. Generally, the component lifted by means of the lifting device 10 may in embodiments of the invention comprise a wind turbine nacelle including one or more of generator, gear, electronic equipment and/or the like, it may comprise a hub alone or a hub with one or more blades mounted on the hub, blades lifted alone and/or the like.

The wind turbines are preferably of the horizontal axis wind turbine types, also known as HAWT wind turbines. Such wind turbines normally comprises a nacelle arranged on top of a wind turbine tower, and comprises two or more, preferably three wind turbine blades arranged to be rotated to provide a torque on a shaft arrangement, and transfer these forces to a generator for generating electrical power to the utility grid. The present system may be suitable for erecting and/or providing service on such wind turbines, configured to provide a power output from 1.5 MW or higher, and also larger wind turbines configured to provide a power output larger than 5 MW such as larger than 7 MW, e.g. larger than 10 MW. These wind turbines may have a nacelle arranged e.g. 100 meters to 300 meters above ground/water level, such as about 150-250 meters above ground/water level.

The system 1 comprises a lifting device 10.

The lifting device 10 comprises a crane connection arrangement 11 which is connected to one or more lifting lines (not illustrated in FIG. 1) for lifting the main components. These lifting lines are guided by a crane boom arrangement 3 of a crane.

Moreover, the lifting device comprises a frame arrangement 12 connected to the crane connection arrangement 11, and a component connection arrangement (not illustrated in FIG. 1 as the lifting device is seen from above) connected to the frame arrangement 12 and configured to be connected directly or indirectly to the component to be lifted.

Moreover, the lifting device 10 comprises a first 13a and a second 13b steering wire guide configured to guide steering wires/lines 20a, 20b. These first and second steering wire guides 13a, 13b preferably comprises pulleys for supporting and guiding the steering wires. The pulleys are thus rotated when the steering wires are adjusted. In other embodiments of the invention, the steering wire guides 13a, 13b may be comprise other types of guides than pulley or wheel arrangements such as e.g. devices having low friction surfaces over which the wires are configured to slide when adjusting the wires 20a, 20b.

The steering wires/lines 20a, 20b may generally, in embodiments of the invention be made from a metal, e.g. steel. In further embodiments, it/they may be made from any suitable polymer material, it/they may be made from Ultra-High Molecular Weight Polyethylene (UHMwPE) also known under the name Dyneema® fibre material, it/they may be made from a polyester material, and/or any other material suitable to provide a wire/rope/line connection 20a, 20b having the desired strength. The same applies for one or more of the lifting lines 3a, see FIGS. 6 and 9 and/or guiding lines/wires 4 in further embodiments of the invention.

The system 1 further comprises a rotation control arrangement 15a, 15b configured to adjust the orientation in a horizontal plane of a component lifted by means of the lifting device 10 by adjusting one or more of the steering wires 20a, 20b and thereby rotating the frame arrangement 12 in the horizontal plane.

In FIG. 1, the rotation control arrangement 15a, 15b, such as winch arrangements which are configured to be operated by means of electric motors, is arranged at the lifting device 10 which may be preferred. In other embodiments of the invention, the rotation control arrangement 15a, 15b may also be arranged away from the lifting device 10 as e.g. indicated in e.g. FIGS. 2, 3 and/or 5, e.g. at the crane arrangement 3.

The rotation control arrangement 15a, 15b may preferably be configured to control the orientation of the component to be lifted, e.g. to keep the component sufficiently still during installation, to keep the lifting device still during connection to the component, and/or the like. The rotation control arrangement 15a, 15b may also in preferred embodiments of the invention be configured to control the rotation RO angle in the horizontal plane within an angle range (see e.g. FIGS. 7-8).

Preferably, each steering wire 20a, 20b may be connected to each their winch of the rotation control arrangement so that individual control of the wires 20a, 20b by winding one of the wires 20a, 20b and simultaneously unwinding the other wire, is possible.

The steering wires 20a, 20b connects the lifting device 10 to a guiding arrangement 4 which is connected to the crane boom arrangement. The steering wires 20a, 20b extend from the guiding arrangement 4 in a direction towards the lifting device 10 with a mutual angle a1 between the steering wires 20a, 20b.

The first and second steering wire guides 13a, 13b are preferably, as illustrated in FIG. 1 and several other figures such as FIGS. 2-3, 5-8 and 10 configured to be displaced towards and/or away from a centre part 19 of the lifting device 10 to control the mutual angle a1, preferably based on control signals from a displacement control system.

The first and a second steering wire guides 13a, 13b arranged to guide the steering wires 20a, 20b. These steering wire guides 13a, 13b preferably acts as "points of applications" at the lifting device 10 for the steering wires 20a 20b, and the distance between the guiding wires 20a 20b where the guiding wires get in contact with the lifting device 10 is provided by the distance between the first and a second steering wire guide 13a, 13b.

Figure 14A:
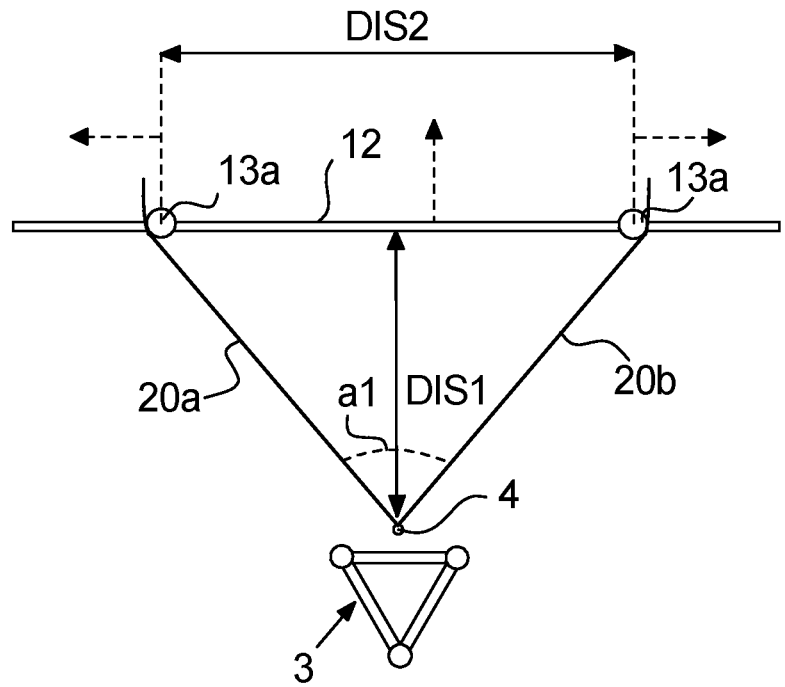
FIG. 14a-14b: illustrates schematically embodiments of the invention regarding further adjustment possibilities that may be provided in accordance with embodiments of the invention.
Figure 14B:
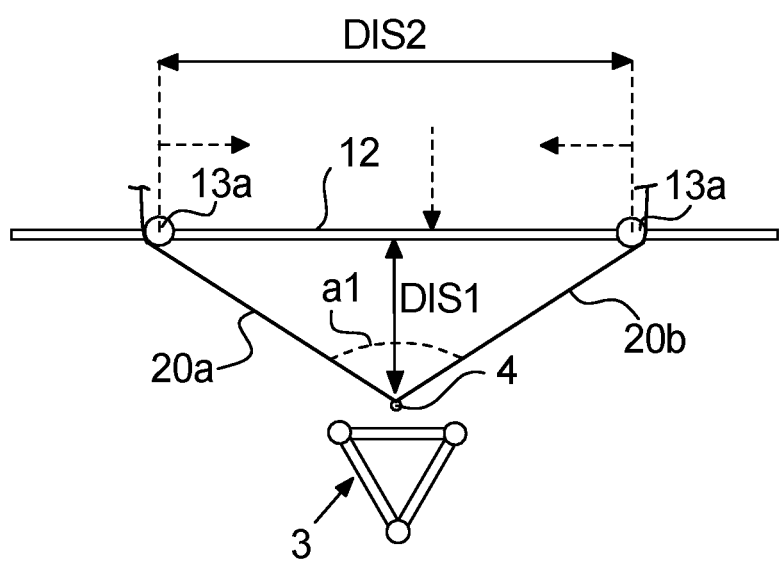

A relative displacement between one or both of the first and second steering wire guides 13a, 13b and the frame arrangement 12 is in the embodiments of FIG. 1 configured to be provided to control the mutual angle a1 between the steering wires 20a, 20b when e.g. the frame arrangement 12 is rotated in the horizontal plane and/or when the lifting device changes the distance to the crane arrangement 3 (see e.g. FIG. 14a-14b and description thereto). Thus, the angle a1 between the steering wires 20a, 20b is controlled by adjusting the mutual distance DIS2 between the first and second steering wire guides 13a, 13b.

This angle a1 may preferably be measured at a position between the connection point 40 at the guiding arrangement 4 and the lifting device 10.

In preferred aspects of the invention, the relative displacement between one or both of the first and second steering wire guides and said frame arrangement is configured to be provided due to and/or in repose to the rotation RO of the frame arrangement, thereby providing the control of the mutual angle a1 between the steering wires when said frame arrangement is rotated in the horizontal plane.

Thus, the steering wire guides 13a, 13b, as they are connected to and supported by said frame arrangement 12 in the embodiments of e.g. FIG. 1, are rotated RO together with the frame arrangement 12 in the horizontal plane when a rotation control arrangement 22 adjusts the one or more of said steering wires by winding or unwinding the steering wires 20a, 20b.

In embodiments of the invention as illustrated in e.g. FIG. 1, the first and second steering wire guides 13a, 13b are configured to be displaced along longitudinal frame parts 12a, 12b of the frame arrangement 12. The longitudinal frame parts 12a, 12b are configured to extend in a direction away from a centre part 19 of the lifting device 10, preferably in a substantially horizontally oriented direction, when the lifting device 10 hangs from said one or more lifting lines.

The longitudinal frame parts 12a, 12b preferably extend in opposite directions from the centre part 19 and are connected to an end frame member 31a, 31b.

The frame arrangement 12 may in embodiments of the invention comprise one or more longitudinal parts 12a, 12b, 31a, 31b, 32a, 32b such as rods or lattice works, one or more plates (not illustrated and/or the like, preferably mace from metal and/or other suitable material.

The end frame member 31a, 31b extend between the first longitudinal frame parts 12a, 12b and a further frame part 32a also extending from the centre part 19 and to the end frame member 31. The frame members 12a, 31a, 32a, and the frame members 12b, 31b, 32b respectively, may e.g., as illustrated form trapezium shaped frame parts extending in opposite directions from the centre part 19. To form side parts 18a, 18b of the frame arrangement 12 and lifting device 10. It may alternatively form e.g. rectangular shaped frame parts, triangular shaped frame parts and/or the like which may thus not comprise the member 31b, or the like.

At least some of these frame parts are preferably configured to directly and/or indirectly supporting the steering wire guides 13a, 13b and/or 14a, 14b as e.g. disclosed in FIG. 1 and several other figures.

In preferred embodiments of the invention, the frame arrangement 12 is rotatable connected to the crane connection arrangement 11 to allow/enable the rotation RO. Thus, in embodiments of the invention, when rotating RO the frame arrangement 12, the crane connection arrangement 11 of the lifting device 10 may not be rotated, see e.g. FIGS. 7-8. The connection between the frame arrangement 12 and the crane connection arrangement 11 may e.g. be provided by a bearing connection comprising a plurality of ball bearings and/or roller bearings, but any other suitable type of suitable, rotatable connection may be utilized in further embodiments of the invention.

In other, advantageous embodiments of the invention, the connection between the frame arrangement 12 and the crane connection arrangement 11 may be fixed so that substantially no rotation RO between the frame arrangement 12 and the crane connection arrangement 11 may be provided. Instead, the rotation may be facilitated by a rotatable connection at e.g. a crane hook arrangement (not illustrated in FIG. 1, see e.g. ref. 34 in FIG. 9) connecting the one or more lifting lines 3a to the crane connection arrangement 11, or at another part arranged between the frame arrangement 12 and the lifting line(s) 3a.

The steering wires 20a, 20b may in aspects of the invention comprise one steering wire arranged to extend over different guiding systems at the lifting device 10 and/or the guiding arrangement to provide steering wires with the mutual angle between the steering wires (not illustrated), or it may in preferred aspects of the invention be provided by two or more, separate steering wires 20a, 20b as illustrated.

Figure 8:
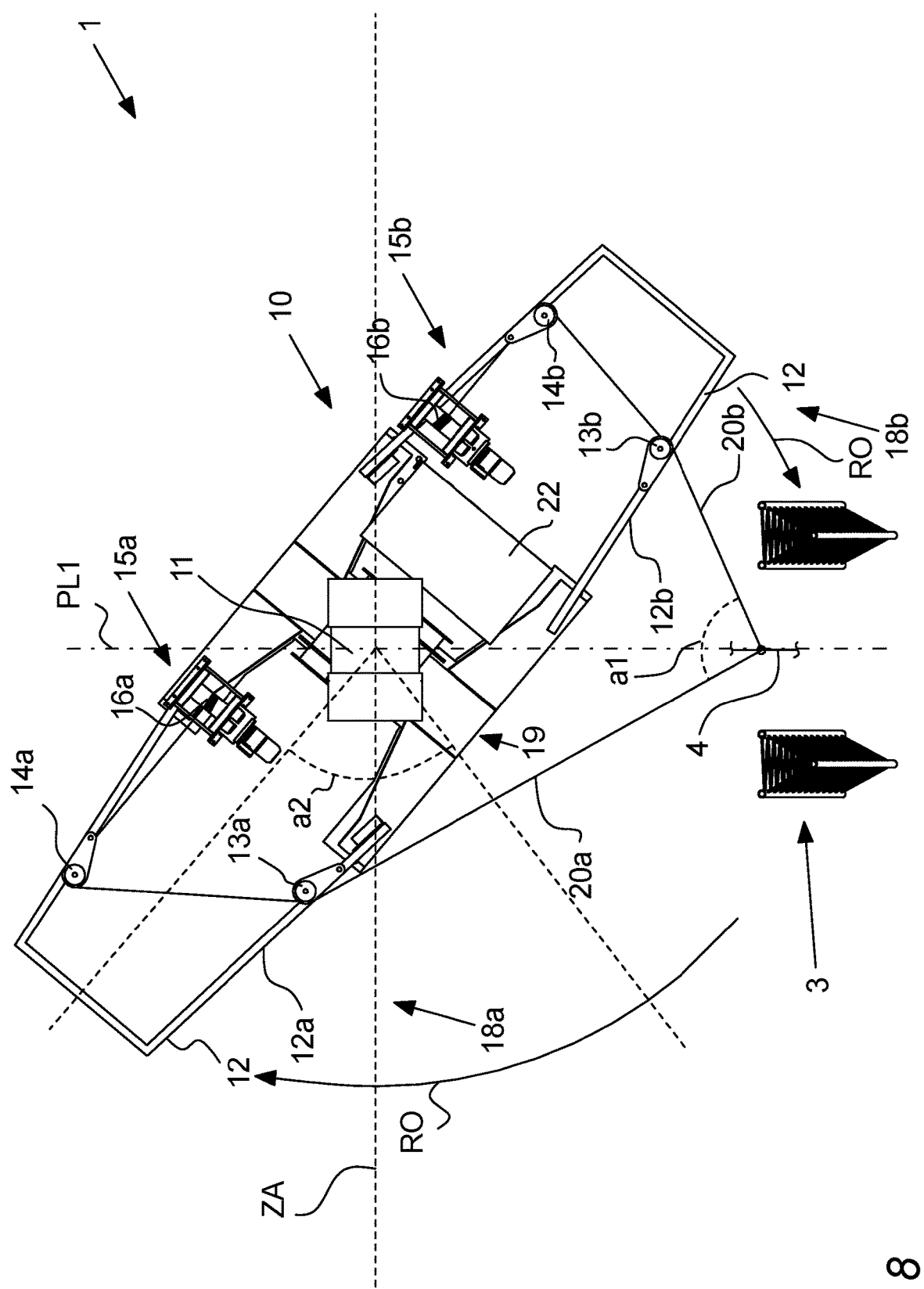
Figure 9:
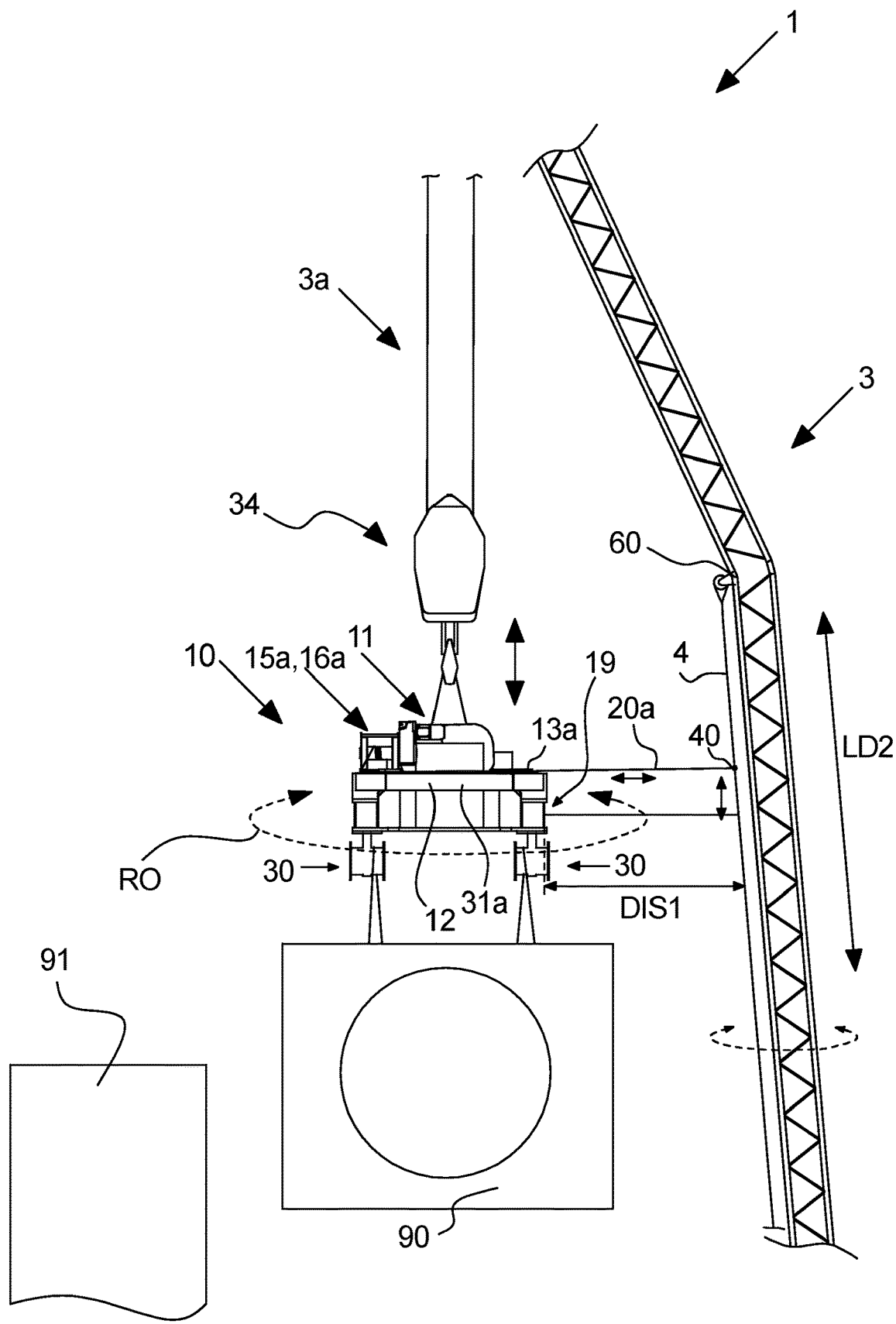
FIG. 9: illustrates an embodiment of a system according to further embodiments of the invention.

The guiding arrangement 4 comprises one or more guiding wires 4 extending in the longitudinal direction of a crane boom of said crane boom arrangement 3, see e.g. FIG. 9. In preferred embodiments of the invention, and as illustrated in several of the FIGS. 1-10, the guiding arrangement 4 comprises a single guiding wire connected to both steering wires 20a, 20b. The steering wires 20a, 20b are preferably slideable connected to the guiding wire(s) by a connection part 40 such as a ring connection (as shown), a pulley connection (not illustrated) or the like so that the lifting and lowering of the lifting device 10 causes that the connection point for the steering wires at the guiding wire(s) 4 moves correspondingly upwards or downwards.

The first and/or second steering wire guides 13a, 13b are preferably configured to provide that the angle a1 between the steering wires is within an angle range between 50° and 130°, preferably between 60° and 120°, such as between 75° and 105°, preferably between 85° and 95° when the frame arrangement (12) is rotated.

The steering wires 20a, 20b are be guided at the lifting device 10 by the first and second steering wire guides 13a, 13b as previously explained, and may moreover from the first and second steering wire guides 13a, 13b be guided over a further steering wire guide 14a, 14b. The first and/or second steering wire guides 13a, 13b may in preferred embodiments of the invention preferably be configured to be displaced relative to the further steering wire guides 14a, 14b.

Generally it is understood that the further guides 14a, 14b in preferred embodiments of the invention may be fixed un-displaceable to the frame arrangement 12 may e.g. be arranged to help to provide a proper guidance towards the connection points 16a, 16b such as winches when rotating RO the frame arrangement.

The first and second steering wire guides 13a, 13b are preferably configured to provide guiding points for the steering wires 20a, 20b at a guiding position between the guiding arrangement 4 and a steering wire connection 16a, 16b at said lifting device 10. This connection in FIG. 1 is provided by the spool of the respective winches 15a, 15b.

The lifting device 10 comprises a displacement control system 22, 17a, 17b for controlling the displacement of the first steering wire guides 13a, 13b relative to the frame arrangement 12 dependent on the rotation direction of the frame arrangement 12 by the adjustment of the steering wires by means of the rotation control arrangements 15a, 15b. This displacement control system 22, 17a, 17b comprises displacement arrangements 17a, 17b arranged at the lifting device 10 and configured to provide a displacement of the respective, steering wire guide 13a, 13b relative to the frame arrangement 12, and preferably further a displacement arrangement controller 22 comprising control circuitry configured to provide control signals to the displacement arrangements 17a, 17b, preferably based on one or more input signals. See e.g. FIGS. 11-12 and/or the description thereto FIG. 2 discloses an embodiment of the invention wherein the steering wire guides 13a, 13b provides the connection point 16a, 16b for the steering wires 20a, 20b at the lifting device. The connection points 16a, 16b in this embodiment are thus arranged at the longitudinal frame parts 12a, 12b supporting the steering wires, whereas it in other embodiments of the invention, as e.g. discloses in FIGS. 1 and 3 may be arranged at another location of the frame arrangement 12, e.g. arranged near the centre part 19.

It is generally preferred that the connection points 16a, 16b are arranged at the lifting device 10 at the frame arrangement 12 so that the connection points are rotated RO together with the frame arrangement 12 and component to be lifted when adjusting the steering wires/ropes/lines. In other embodiments of the invention the steering wire connections 16a, 16b may however be located at/together with the crane connection arrangement 11 and so that the rotation RO in the horizontal plane does not provide a rotation of the steering wire connections 16a, 16b.

Generally, in embodiments of the invention, the rotation control arrangements 15a, 15b may be controlled to provide and control a pre-tensioning of the steering wires/lines 20a, 20b toe e.g. be able to keep the lifted component and/or the lifting device 10 sufficiently still. The amount of pre-tensioning may e.g. be adjusted based on the weight of the component 90 to be lifted and/or the load-capacity of the winches 15a, 15b. Such a pre-tensioning may e.g. also be provided/maintained during the movement of the lifting device 10 and component towards/away from the guiding wire/crane boom arrangement 30 as e.g. illustrated and described in relation to FIGS. 14a, 14b.

Figure 2:
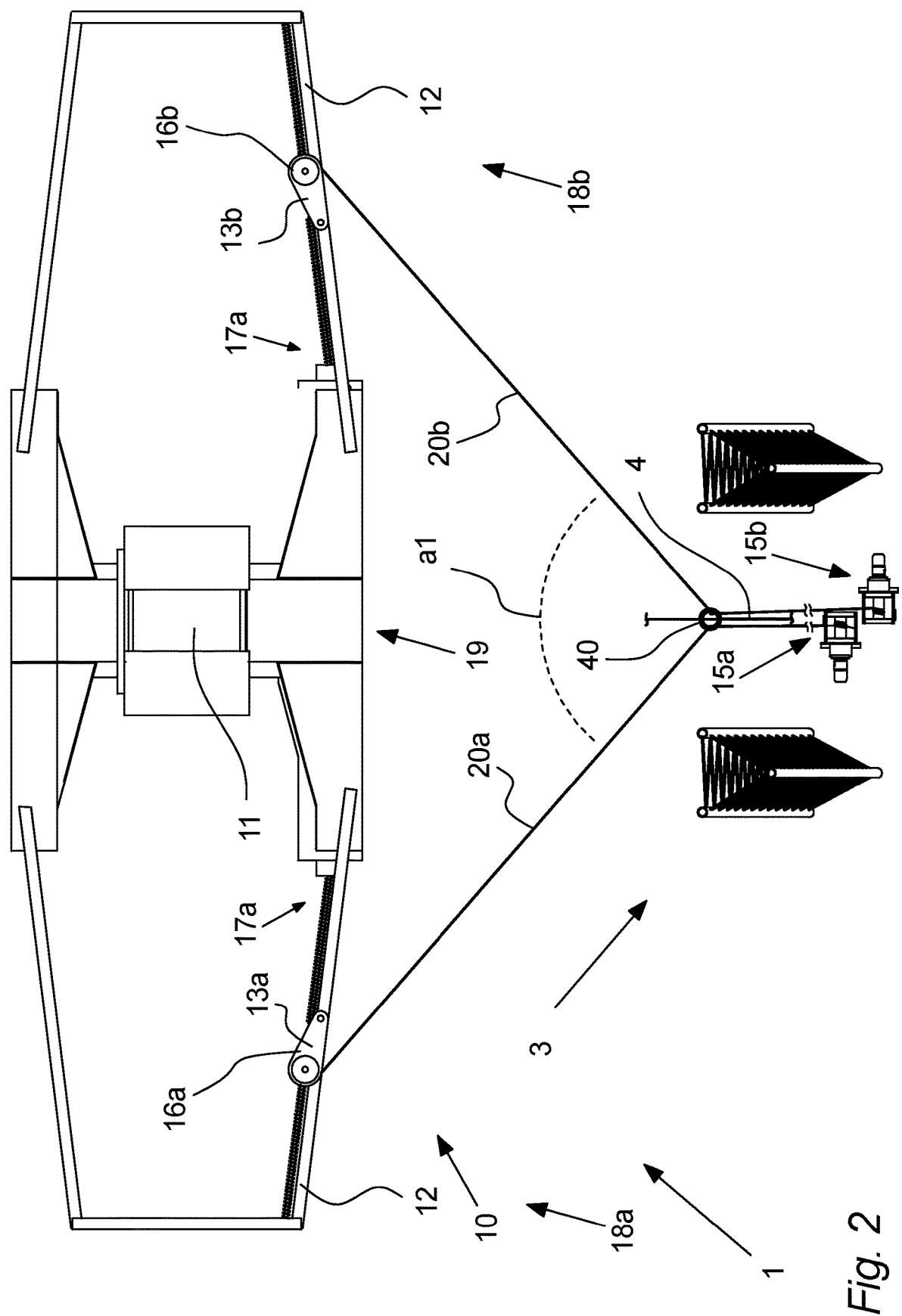
FIG. 2: illustrates a lifting system where a rotation control arrangement is arranged externally to a lifting device in accordance with embodiments of the invention.

FIG. 2 discloses a further embodiment of the invention, wherein the rotation control arrangement 15a, 15b are arranged away from the lifting device 10. The wires/lines/ropes 20a, 20b are connected to the lifting device via the connection 40 such as a ring or pulley system, and thus by winding or unwinding the steering wires, e.g. at a bottom part of the crane arrangement (not illustrated), the steering wires 20a, 20b are adjusted to rotate the frame arrangement 40.

Figure 3:
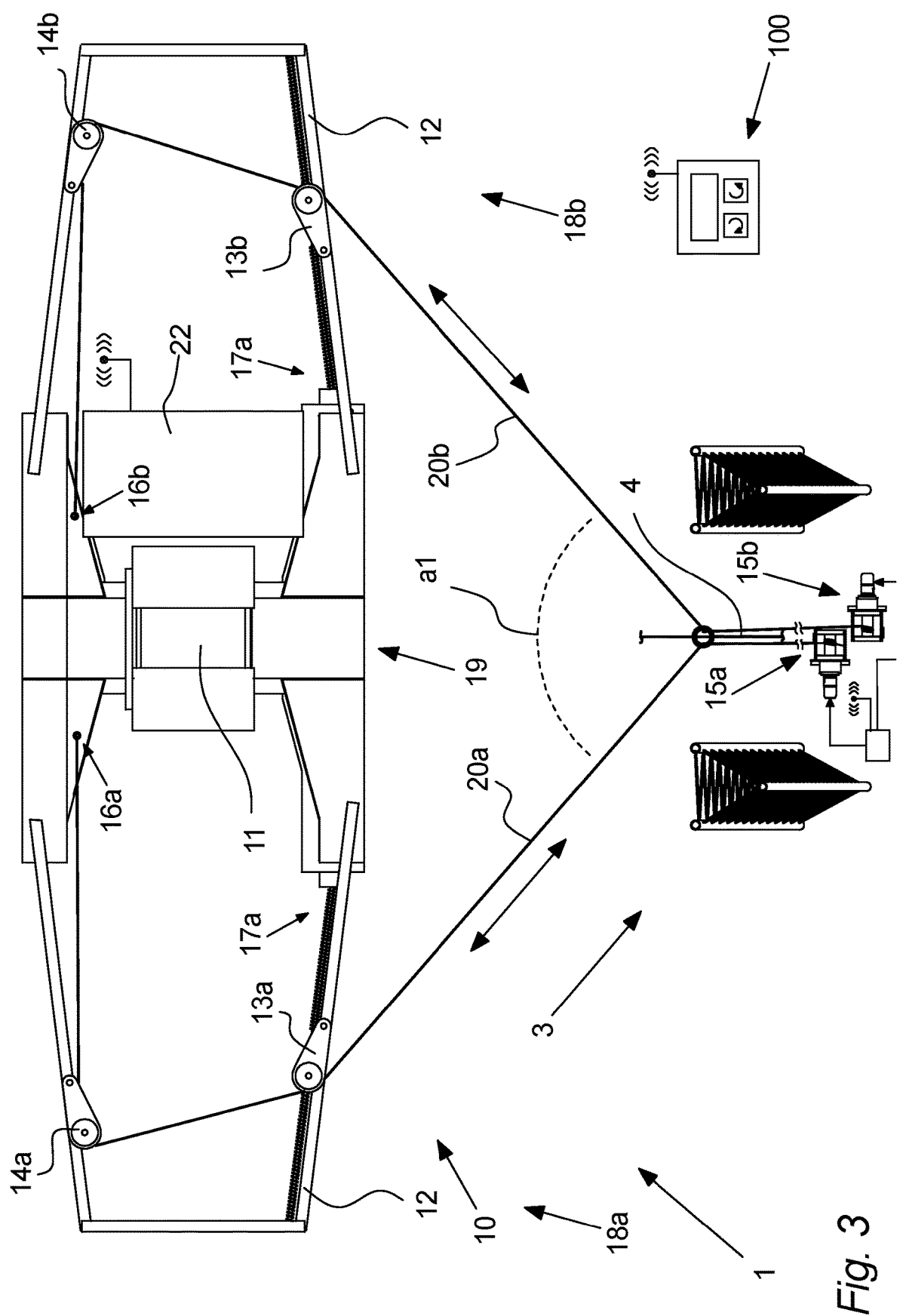
FIG. 3: illustrates a lifting system comprising a lifting device according to further embodiments of the invention.

The same adjustment possibility is provided in FIG. 3, where the lifting device is also seen schematically and from above, however where the steering wires are here guided substantially as in FIG. 1, but are connected to the lifting device 10 at a location of the frame arrangement 12 near the centre part 19.

FIG. 3 moreover discloses an embodiment of the invention wherein the displacement arrangement controller 22 is controlled by means of signals from a remote control 100 transmitting wireless signals to the displacement arrangement controller 22 to control the steering wire guides 13a, 13b, and to the rotation control arrangement 15a, 15b to control the adjustment of the steering wires 20a, 20b and thus the rotation of the frame arrangement. The system 1 thus comprises the suitable wireless communication means comprising antenna systems, data processors and/or the like in order to provide the wireless communication in a suitable way.

The same may naturally be applied if the rotation control arrangement 15a, 15b is located at the lifting device 10 in further embodiments of the invention).

Figure 4:
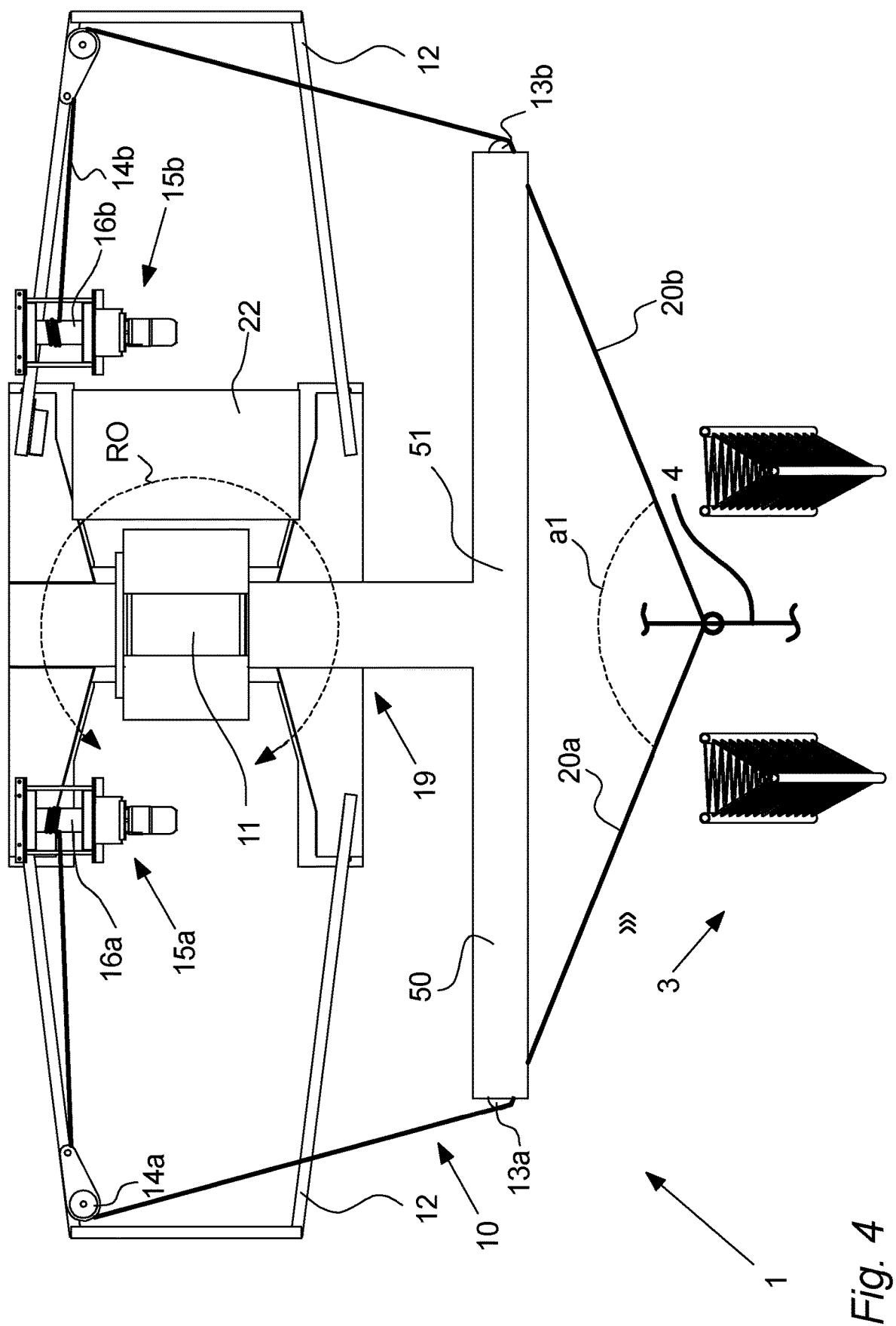
FIG. 4: illustrates embodiments of the invention where a frame arrangement is rotated relative to a part of a lifting device comprising first and second steering wire guides.

FIG. 4 discloses embodiments of the invention wherein the relative displacement between one or both of the first and second steering wire guides 13a, 13b and frame arrangement 12 is configured to be provided by keeping the steering wire guides 13a, 13b in a substantially fixed position at a steering wire guide support 50 separate to the frame arrangement 12. The lifting device 10 comprises the steering wire guide support 50, in the present embodiment formed with a T-shape, but it may have other shapes, and having a middle part 51 separating the steering wire guides 13a, 13b with a mutual distance to provide the angle a1.

The frame arrangement 12 is rotated relative to the steering wire guide support 50 when adjusting the steering wires 20a, 20b, and thus a relative displacement between one or both of the first and second steering wire guides 13a, 13b and frame arrangement 12 is provided, thereby controlling the mutual angle a1 between the steering wires 20a, 20b when the frame arrangement 12 is rotated RO in the horizontal plane as the angle a1 is kept substantially constant during the rotation RO of the frame and as the distance between the steering wire guides is kept constant by the steering wire guide support 50. The steering wire guide support 50 may in some embodiments provide an angle a1 between the steering wires/lines/ropes 20a, 20b, between the guiding arrangement 4 and the lifting device, which is between 80° and 150°, such as e.g. between 110° and 150°, as the middle part 51 may provide a sufficient distance between guides 13a, 13b which provides that a rotation of the frame arrangement 12 does not risk that the frame arrangement will be harder to control during rotation RO at larger rotation ranges.

Figure 5:
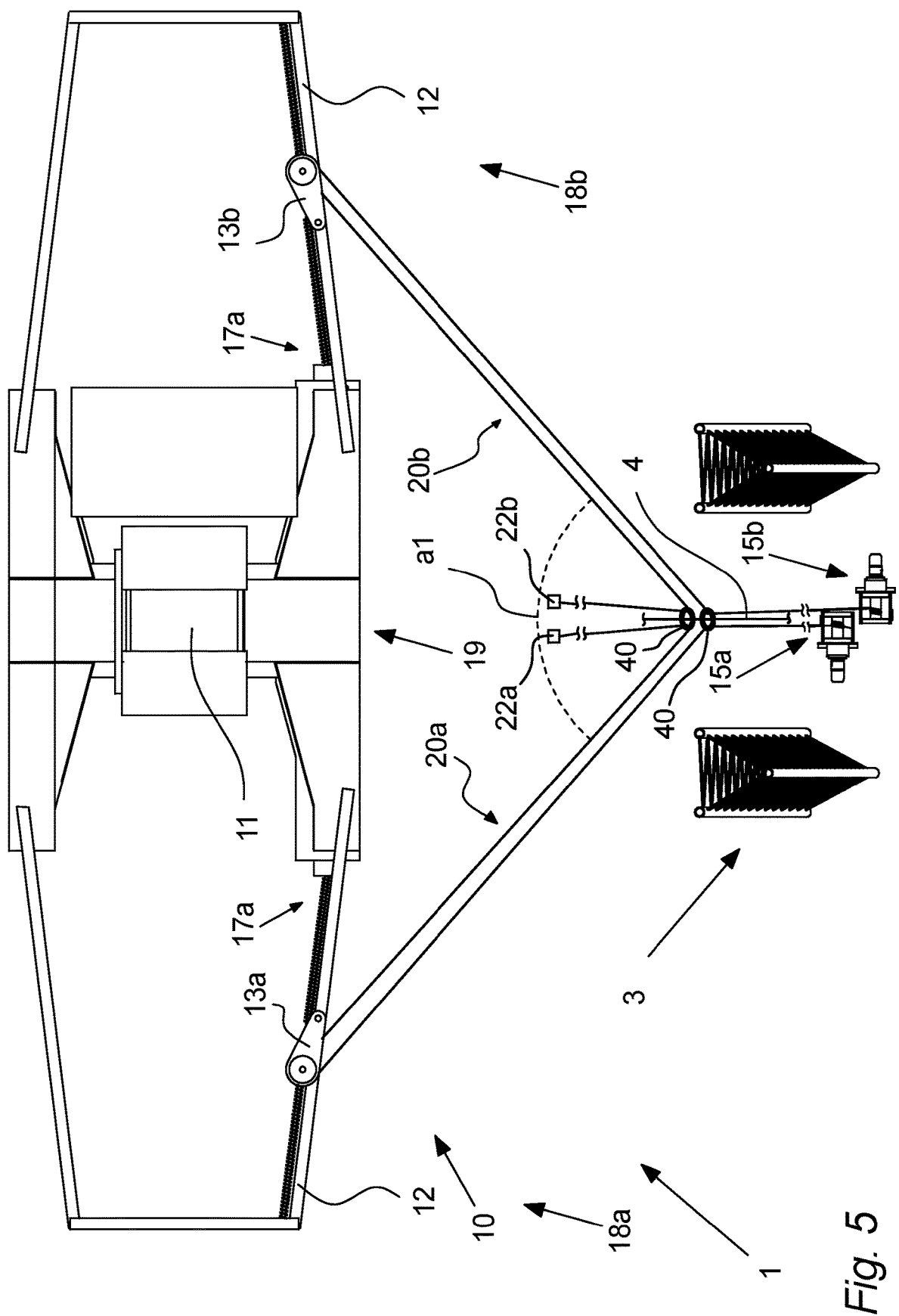
FIG. 5: illustrates a lifting system where a rotation control arrangement is arranged externally to a lifting device in accordance with further embodiments of the invention.

FIG. 5 discloses an embodiment of the invention wherein the steering wires/lines runs from the adjustment arrangements 15a, 15b, and via the connection 40 from the guiding arrangement 4 and over the first and second steering wire guides 13a, 13b respectively, and back towards the crane boom arrangement again to a connection point 22a, 22b located away from the lifting device 10, e.g. at the top or bottom part of the crane arrangement. The steering wires/lines 20a, 20b may e.g. in embodiments of the invention run back from the lifting device 10 and via a further connection 40 (as illustrated) towards the connection 22a, 22b, or may in other embodiments of the invention (not illustrated) run back from the lifting device 10 and via the same connection 40 guiding the steering wires/lines from the arrangements 15a, 15b towards the device 10, and therefrom towards the connection 22a, 22b. These connections 22a, 22b may e.g. be arranged at the crane arrangement, e.g. near a connection point for the guiding wire(s) 4 at e.g. the crane boom arrangement (see e.g. point 60 in FIG. 9) and/or the like.

Figure 6:
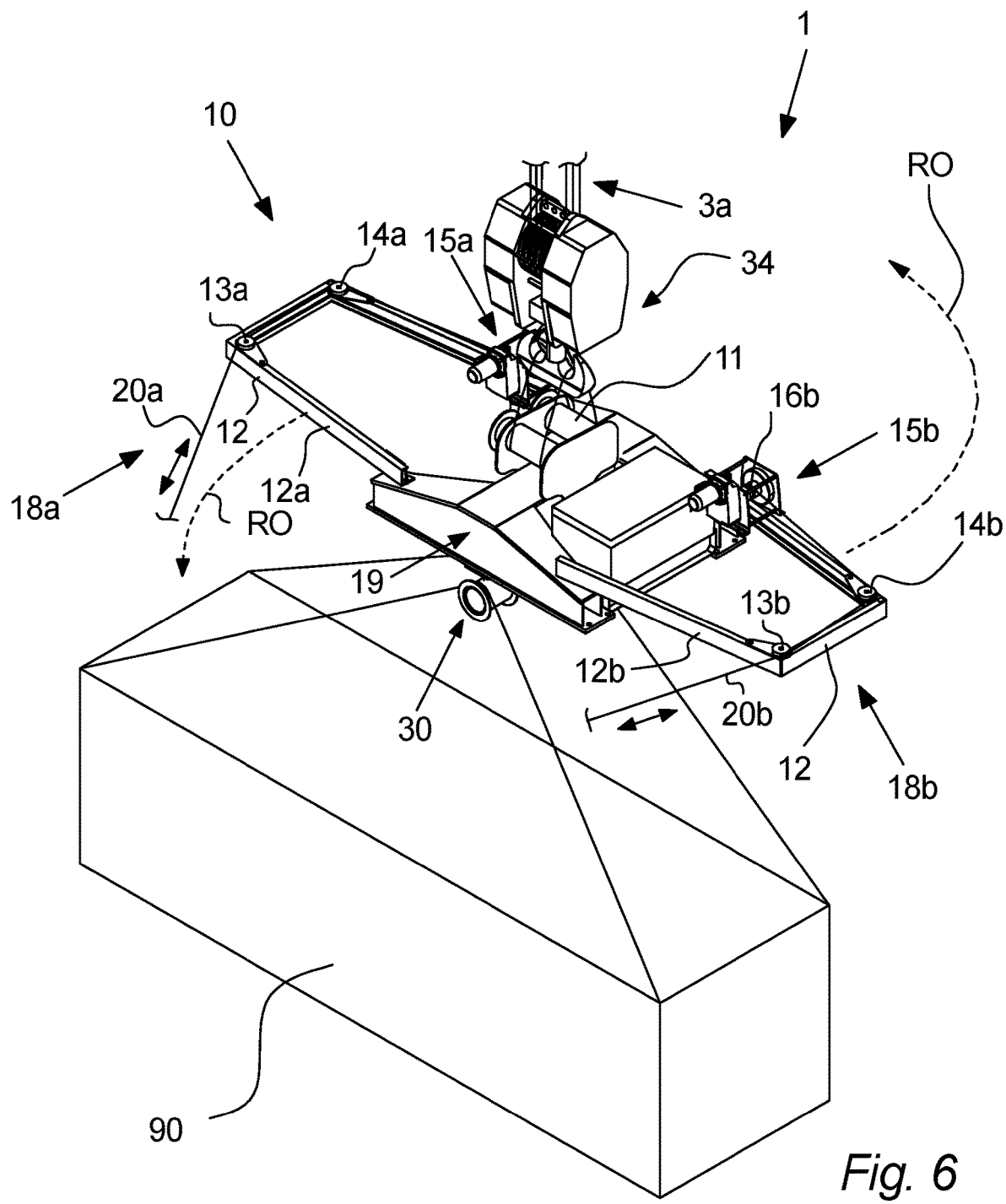
FIG. 6: illustrates a lifting device arranged to lift components such as wind turbine main components in accordance with embodiments of the invention.

FIG. 6 illustrates embodiments of the invention where the lifting device 10 is seen in in perspective and hangs from lifting wires 3a. The crane connection arrangement 11 of the lifting device 10 is connected to one or more lifting lines 3a via a hook arrangement 34. The hook arrangement 34 may as illustrated comprise pulleys connecting the lifting lines to the hook arrangement 34.

In other embodiments of the invention which are not illustrated, the lifting line(s)/wire(s) 3a may be connected directly to the crane connection arrangement 11. The crane connection arrangement 11 may in such embodiments e.g. comprise one or more pulleys or the like connecting the lifting lines to the connection arrangement 11.

A component 90 to be lifted is connected to the component connection arrangement 30 of the lifting device 10. The component connection arrangement 30 is connected to the frame arrangement 12, and thus, when rotating the frame arrangement 12 by adjusting the steering wires/lines 20a, 20b as e.g. described above or below, the component 90 hanging from device 10, is also rotated RO. The rotation is only indicated by dashed arrows in FIG. 6 with a rotation counter clockwise seen from above, but it may naturally also be rotated RO in the other direction by adjustment of lines/wires 20a, 20b.

The component 90 is only illustrated in FIG. 6 as a generic component, but it is naturally understood that the component may e.g. be a wind turbine blades, wind turbine tower sections, wind turbine nacelle, wind turbine hub, and/or a generator and/or gear box for a wind turbine. Suitable connection means may thus in different embodiments of the invention be utilized (not illustrated) in order to provide/obtain a proper connection between component connection arrangement 30 and the load/component 90. This may e.g. comprise at least two or more connections between component 90 and component connection arrangement 30 to enable rotation of the component/load 90 when rotating frame arrangement 12. In the embodiment of FIG. 6 the component 90 is connected at two points at the component connection arrangement 30.

Figure 7:
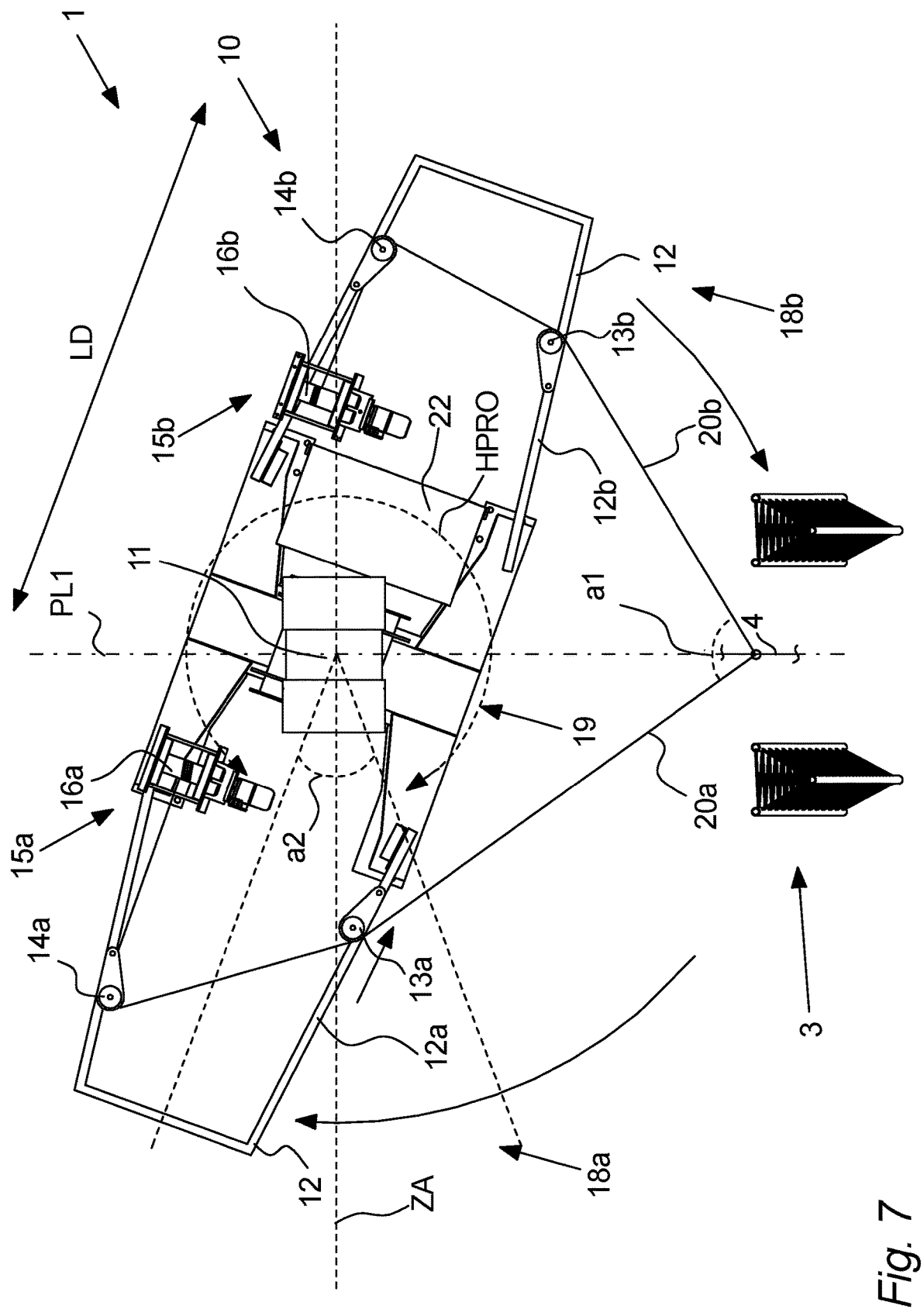
FIGS. 7-8: illustrates embodiments of the invention where a frame arrangement of a lifting device is rotated in the horizontal plane so as to change the horizontal orientation of a component lifted by means of the lifting device.

FIGS. 7 and 8 illustrate an example of the adjustment of the first and/or second steering wire guides 13a, 13b to control the angle a1 according to embodiments of the invention. As can be seen in these figures, the first steering wire guide 13a is arranged at a first side 18a of a centre part 19 of the frame arrangement 12, and the second steering wire guide 13b is arranged at second, opposite side 18b of the centre part 19. The rotation control arrangement 15a, 15b is configured to provide a rotation RO of the frame arrangement 12 in the horizontal plane so that one of said sides 18a or 18b is moved in a direction away from the crane boom arrangement 3 (in FIGS. 7-8 it is side 18a) while the other of said sides 18a, 18b is moved in a direction towards the crane boom arrangement, (in FIGS. 7-8 it is side 18b).

This rotation is in the present example provided by winding one of the steering wires and unwinding the wire 20a correspondingly, thereby providing the rotation RO in the horizontal plane. The adjustment of the steering wires 20a, 20b thus provide the rotation RO is in the present example by unwinding of the left (seen from above from the crane boom arrangement) steering wire 20a and winding the other (right) of the steering wires 20b. Should the rotation be counter-clockwise instead seen from above, the steering wire 20b should be unwinded and the other of the steering wires 20a should be winded.

As can be seen in FIG. 1, the lifting device 10 comprises displacement arrangements 17a, 17b arranged at the lifting device 10 and configured to provide a displacement of the respective, steering wire guide 13a, 13b relative to the frame arrangement 12. In the present example, the displacement arrangements 17a, 17b comprises a threaded spindle connected to a nut (not illustrated) fixed to the respective steering wire guide so that when rotating the spindle by means of a motor or the like, the steering wire guide 13a, 13b is displaced in the longitudinal direction of the spindle. In other embodiments however, the displacement arrangements 17a, 17b may comprise a chain arrangement, a linear actuator and/or any other suitable displacement arrangement, e.g. a movable arm to be adjusted and comprising the steering wire guide 13a, 13b by e.g. a rotational movement of the respective steering wire guide 13a, 13b relative to the frame 12, see e.g. FIG. 10.

It is understood that the displacement arrangement controller 22 in further embodiments of the invention may be arranged external to the lifting device 10 and send control signals to the displacement arrangements by means of one or more wired or wireless communication means.

The angle a1 may preferably be configured to be kept within said angle range for angle a1, within a frame rotation RO range RORA (illustrated in FIG. 8) of ±60° (a2) such as within a frame rotation range RORA of ±50° e.g. within a frame rotation range RORA of about ±40°. The "±" defines the rotation RO direction of the frame arrangement 12 i.e. either clockwise or counter clockwise dependent on the operational sign + or −.

The frame rotation range is the range within which the frame arrangement 12 may be rotated.

The angle a2 may preferably have a "zero angle" when the sides 18a, 18b have a substantially similar distance to the crane arrangement 3 and/or so that the longitudinal direction LD of the lifting device 10 extends in a direction ZA substantially perpendicular to a vertical plane PL defined substantially by the guiding wire 4 or a vertical centre axis of the crane boom arrangement (not illustrated), and the lifting wire arrangement 3a, respectively (see lifting wire(s) 3a in FIG. 9 and/or).

The displacement control system (not illustrated in FIG. 7 or 8) is, in response to an adjustment of the steering wires 20a, 20b, configured to provide a displacement of the steering wire guide 13a, 13b arranged at the side 18a, 18b moving away from the crane boom arrangement 3 in a direction towards the centre part 19. Thus, in the embodiment of the FIG. 7, the steering wire guide 13a is moved in a direction towards the centre part 19.

In other or further embodiments of the invention, the displacement control system may be configured, in response to an adjustment of one or more of said steering wires, to provide a displacement of the steering wire guides 13a, 13b arranged at the side moving towards the crane boom arrangement in a direction away from or towards said centre part 19 during the same rotation RO of the frame 12 in the horizontal plane provided by adjusting the steering wires 20a, 20b.

FIG. 9 illustrates embodiments of the system 1 seen from the side where the lifting device 10 hangs from the lifting wire arrangement 3a which are guided by a crane comprising a crane boom arrangement 3. The lifting device 10 lifts a component/load 90, in this case a nacelle to be arranged on top of a wind turbine tower 91.

The rotation RO in the horizontal plane of the component/load 90 may thus be provided by adjustment of steering wires/lines 20a, 20b (only 20a is visible in FIG. 9) by arrangements 15a, 15b as e.g. described above and/or below.

As can be seen, the guiding arrangement 4 comprises a guiding wire 4 extending in the longitudinal direction LD2 of a crane boom of the crane boom arrangement 3. The guiding wire 4 is connected at a top part of the crane boom arrangement, in the present example at/near a boom point 60.

It is generally to be understood that the crane arrangement 3 may be of any suitable type suitable for installing wind turbine components and/or dismounting components of wind turbines.

The distance DIS1 between the guiding arrangement 4 such as the line 4, or alternatively the crane boom arrangement 3 may in embodiments of the invention be varied by the crane arrangement by e.g. adjusting the angle of the crane boom, a jib part (not illustrated) or by any other suitable means. The distance between the centre part 19 and the guiding arrangement 4 such as a guiding wire 4 may be between 1.5 meter and 50 meters, preferably between 3 and 20 meters such as preferably 3 meters and 10 meters, at least during handling one or more of the previously mentioned main components at the wind turbine site to e.g. install or disassemble/dismount a wind turbine.

Figure 10:
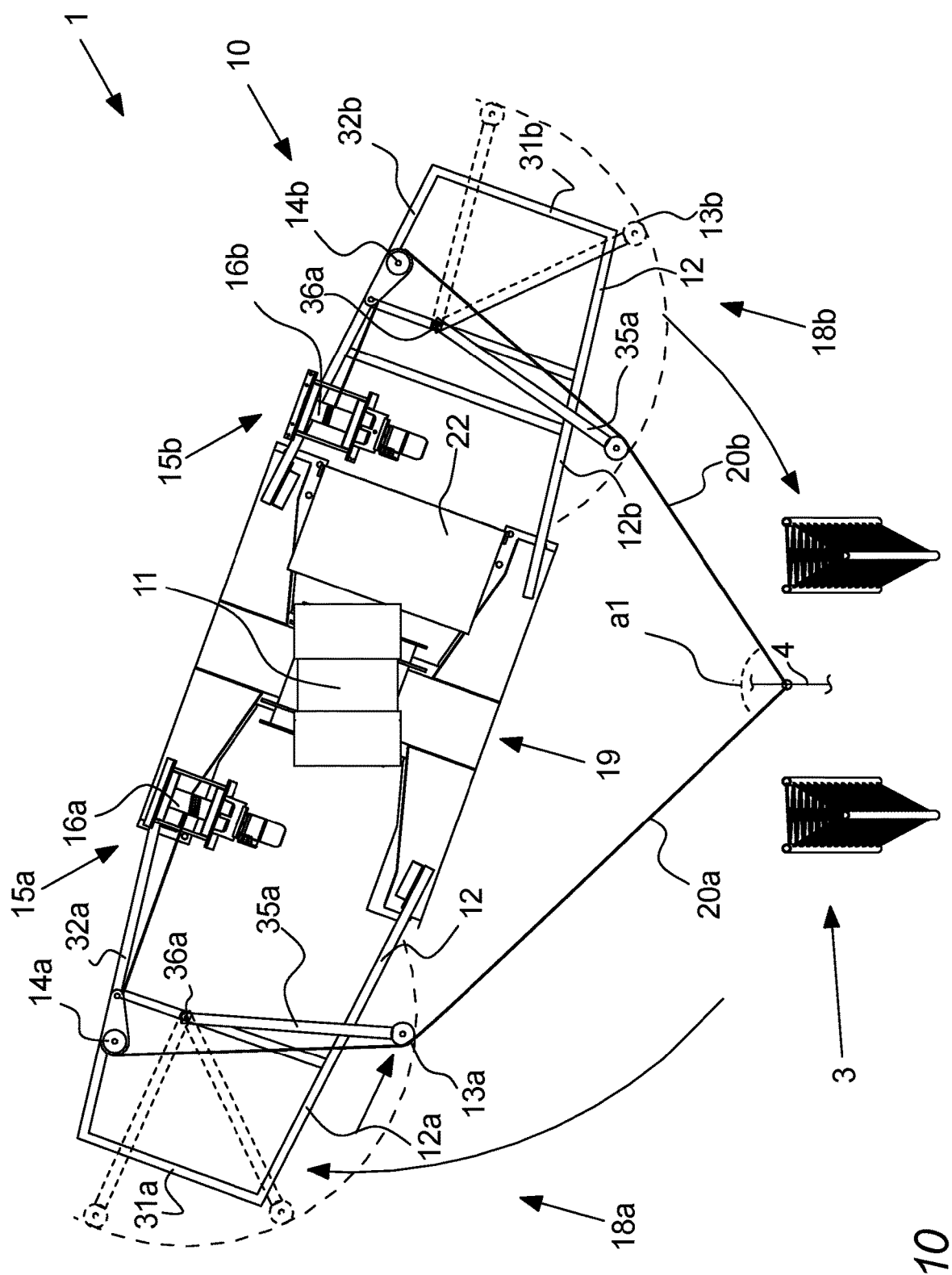
FIG. 10: illustrates a lifting device comprising steering wire/line guides on movable arms according to embodiments of the invention.

FIG. 10 illustrates an embodiment of the invention where the displacement arrangement for displacing the first and second steering wire/line guides (13a, 13b) comprises a movable arm 35a, 35b.

The guides 13a, 13b are connected to each their arm at each side 18a, 18b of the frame arrangement 12. The arms are rotatable connected to the frame arrangement 12 at arm connection points 36a, 36b. The arms 35a, 35b are arranged to be rotated at the connection points, thereby providing the relative displacement between the first and second steering wire guides 13a, 13b and the frame arrangement 12 to control the mutual angle a1 between the steering wires 20a, 20b when the frame arrangement 12 is rotated RO in the horizontal plane.

The steering wire guides 13a, 13b may thus, in embodiments of the invention, be displaced beyond end frame members 31a while supported by the rotatable arm 35a, 35b, thereby allowing a larger displacement range of the steering wire/line/rope guides 13a, 13b while e.g. having a frame arrangement 12 of a reduced size. The displacement of the rotatable arms 35a, 35b may e.g. be provide by displacement arrangements 17a, 17b (not illustrated in FIG. 10) as previously described, or by means of any suitable type of displacement arrangement.

The frame parts 12a, 12b, 31a, 31b and/or 32a, 32b may in embodiments of the invention be configured to support the arm 35a, 35b during the displacement of the respective arm. This may e.g. be provided by means of a rail system (not illustrated) in the respective frame parts 12a, 12b, 31a, 31b and/or 32a, 32b connected to the arms 35a, 35b. The arms 35a, 35b may moreover comprise a rail system (not illustrated) extending in the longitudinal direction of the arms for e.g. providing a guidance of a connector (not illustrated) connecting the arms 35a, 35b and one or more of the respective frame parts 12a, 12b, 31a, 31b and/or 32a, 32b during the displacement of the guides 13a, 13b.

Figure 11:
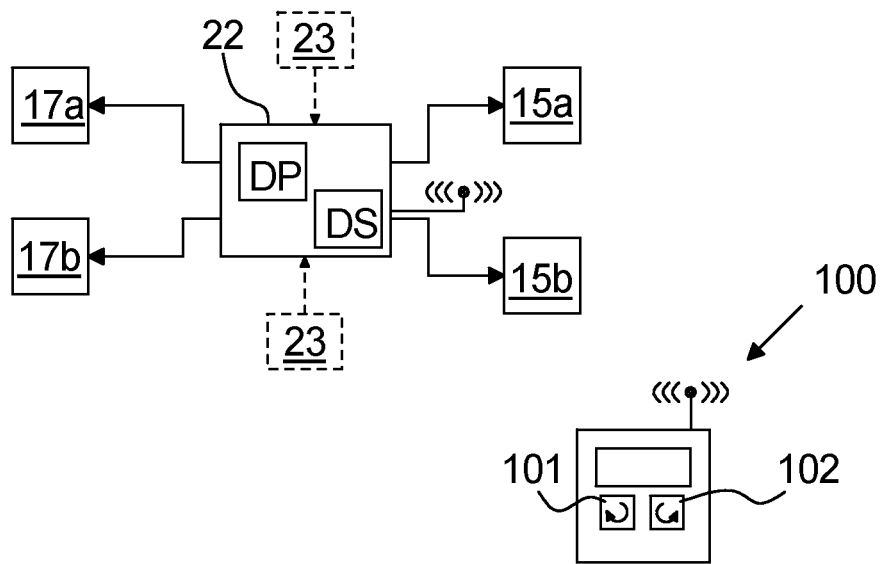
FIG. 11: illustrates embodiments of a control system according to embodiments of the invention.

FIG. 11 schematically discloses embodiments of a control system for providing a control of the rotation of the frame arrangement 12 and load/components 90 (not illustrated), and preferably also to actively control the displacement of the steering wire/line guides 13a, 13b in embodiments of the invention where one or more of these are configured to be displaced relative to the frame arrangement 12 by displacement arrangements 17a, 17b such as disclosed in accordance with various embodiments described and/or illustrated in relation to e.g. FIGS. 1-3 and/or FIGS. 5-10.

The control system comprises a remote control 100 for controlling the rotation RO of the components to be lifted by means of buttons 101, 102 to be controlled by a human operator. The remote control 100 transmits wireless (or alternatively wired) signals to the displacement arrangement controller 22.

The displacement arrangement controller 22 may in embodiments of the invention be configured to control the rotation control arrangement 15a, 15b to adjust the steering wires/lines 20a, 20b to provide the rotation RO, (see e.g. FIGS. 7-8 illustrating embodiments of the rotation). In other embodiments, another control system may be configured to control the rotation RO.

In aspects of the invention, the angle a1 between wires/lines 20a, 20b to be controlled may be determined by e.g. a control arrangement based on the distance between the first and second steering wire guides 13a, 13b, the orientation of the frame arrangement 12 in the horizontal plane and/or the distance between the lifting device 10 and the guiding arrangement 4 or crane boom arrangement 3. One or more of these may be determined by means of a sensor arrangement 23 providing input to the control arrangement.

The displacement arrangement controller 22 is configured to control the displacement arrangements 17a, 17b and thereby the displacement of the steering wire guides 13a, 13b relative to the frame arrangement 12a, 12b, dependent on the rotation of the frame arrangement 12. This is preferably provided by transmitting control signals (see arrows) to the displacement arrangements 17a, 17b to e.g. control the displacement direction of the steering wire guides 13a, 13b dependent on the rotation RO direction of the frame arrangement 12 provided by rotation control arrangements 15a, 15b.

The control of the displacement arrangements 17a, 17b may in advantageous embodiments of the invention be provided by means of input from one or more sensors 23. These sensors may e.g. comprise

- One or more load sensors and/or torque sensors configured to register loads/forces acting on e.g. the steering wire guides 13a, 13b from e.g. steering wires/lines 20a, 20b. These may be arranged at the steering wires, at the rotation control arrangement 15a, 15b and/or at any suitable connection.
- One or more angular sensors configured to register an angle with respect to the horizontal plane of the component/load/lifting device to determine whether to move the load/component 90 towards or away from the crane boom arrangement by means of the lines 20a, 20b (e.g. by winding or unwinding both)
- One or more position sensors for registering the position of the steering wire guides 13a, 13b,
- One or more sensors arranged to determine the angle a1 between the steering wires 20a, 20b One or more sensor arrangements for determining/detecting the angular displacement/orientation of the frame arrangement in the horizontal plane between e.g the crane connection arrangement 11 and the frame arrangement due to the rotation RO of the frame arrangement 12 relative to the crane connection arrangement 11.

And/or any other suitable type of sensor arrangement

The one or more sensors may e.g. comprise strain gauge sensors, optical sensors, magnetic sensors, inertial sensors such as a gyroscope arrangement and/or accelerometer arrangements and/or the like.

The one or more sensors 23 may be arranged at the frame arrangement 12, at/together with the steering wire guides 13a, 13b, at a hook arrangement 34, at or near a connection for rotatable connecting the crane connection arrangement 11 and the frame arrangement 12 and/or the like.

Figure 12:
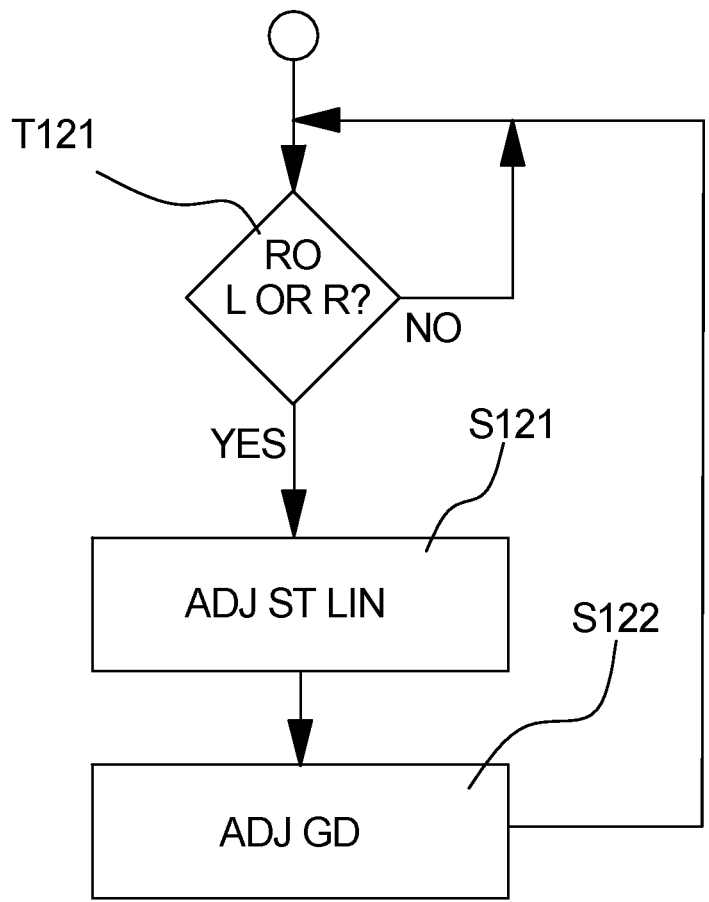
FIG. 12: illustrates a flowchart relating to control of the rotation of a frame arrangement according to embodiments of the invention.

FIG. 12 illustrates a flowchart relating to control of the rotation in accordance with embodiments of the invention. The control system, such as the control system 22 illustrated in FIG. 11, registers in test T121 whether input control signals have been received from e.g. a remote control or the like, and comprising control signals to rotate RO the frame arrangement 12 either clockwise or counter clockwise. If such control signals are received, the control system provides an adjustment of the steering wire/lines 20a, 20b in step S121 (ADJ ST LIN). Additionally, an adjustment of the steering wire guides 13a, 13b is preferably also provided in step S122, if needed, in order to control the angle a1 between the wires.

It is generally understood that the adjustments provided in step S121 and/or 122 may be provided based on input from one or more sensors/sensor arrangements as e.g. previously described, in order to avoid overload on parts of the lifting device 10 or the crane arrangement 3.

It is generally to be understood that the control arrangement for controlling the rotation RO and/or displacement of the steering wire/line guides 13a, 13b may comprise a data processing arrangement, e.g. comprising one or more hardware processors, a data storage for storing program code in accordance with which the data processor operate in order to provide a control of the system 10 as e.g. disclosed above and/or in the claims.

FIGS. 13a-13d illustrates schematically various embodiments of connecting the steering wires 20a, 20b to the guiding arrangement 4 in accordance with embodiments of the invention.

Figure 13A:
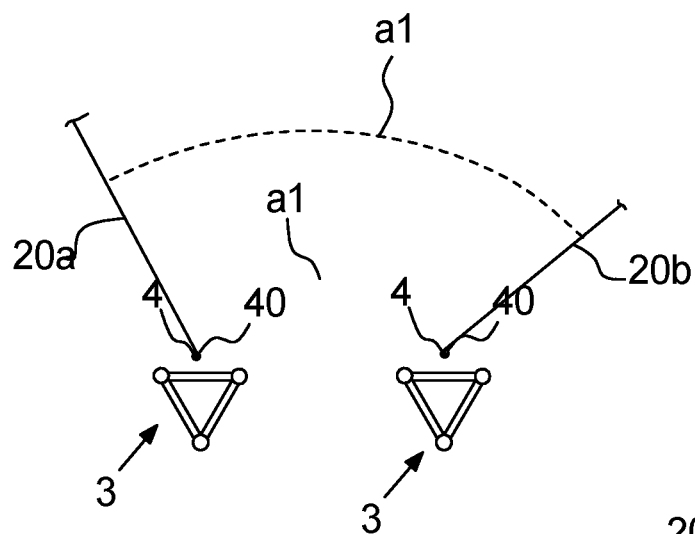
FIGS. 13a-13d: illustrates steering wires connected to a guiding arrangement according to various embodiments of the invention.
Figure 13B:
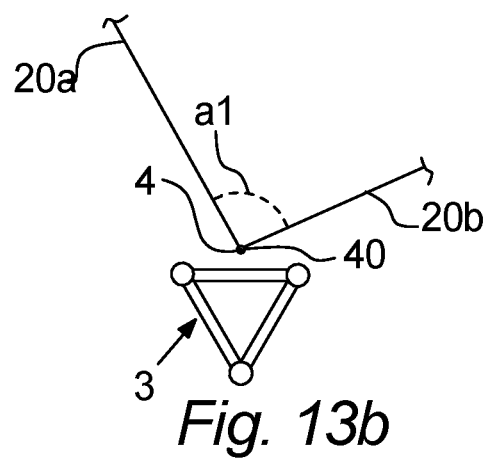
Figure 13C:
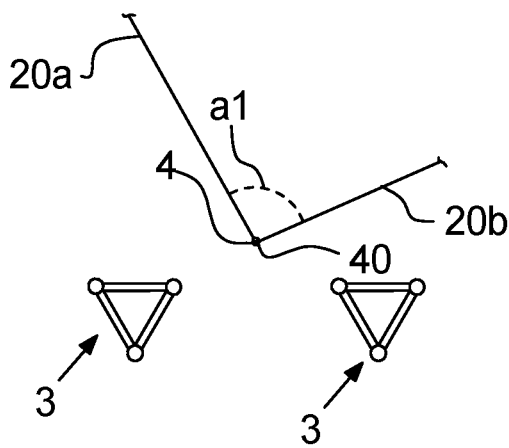

FIGS. 13b and 13c illustrates preferred embodiments of the invention where the steering wires/lines 20a, 20b are connected to a single guiding wire 4.

Figure 13D:
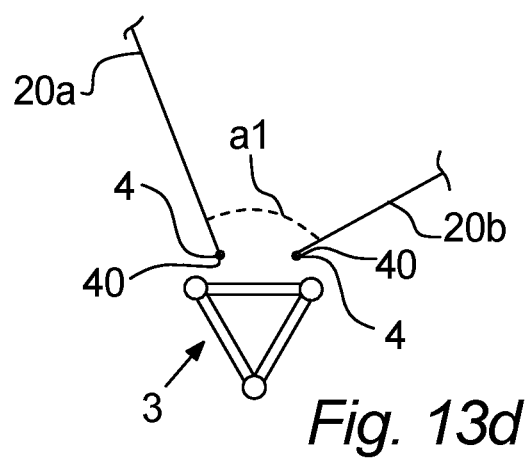

FIGS. 13a and 13d illustrates embodiments of the invention where the steering wires/lines 20a, 20b are connected to each their guiding wire 4 which are arranged with a mutual distance and each extending along the crane boom arrangement 3 of a crane.

Moreover, FIGS. 13a-13d discloses embodiments of the invention wherein the crane arrangement may comprise one crane boom (FIGS. 13b and 13d) or more than one crane boom (FIGS. 13a and 13c) such as two, parallel crane booms.

FIGS. 14a, 14b illustrates schematically embodiments of the invention regarding further adjustment possibilities that may be provided.

In FIG. 14a, the mutual distance DIS2 between the first and second steering wire guides 13a, 13b is configured to be increased (see dashed arrows) in response to an increase in the distance DIS1 between the crane boom arrangement 3 and/or guiding arrangement, and the lifting device 10 (in FIGS. 14a and 14b illustrated by a part of the frame arrangement 12). This may help to avoid an undesired, reduced angle a1 between the wires/lines 20a, 20b.

In FIG. 14b, the mutual distance DIS2 between the first and second steering wire guides 13a, 13b is configured to be reduced in response to a decrease in the distance DIS1 between the crane boom arrangement 3 and/or guiding arrangement 4 and the lifting device 10. This may help to avoid an undesired, enlarged angle a1 between the wires/lines 20a, 20b.

Generally, when amending the distance DIS1 between the lifting device 10 and the guiding arrangement 4, this preferably also comprises/result in that the rotation control arrangement 15a, 15b (not illustrated in FIGS. 14a, 14b) adjust the steering wires 20a, 20b. This may e.g. be provided based on measuring the tension in/forces acting on the steering lines/wires 20a, 20b and/or steering wire guides 13a, 13b, by a sensor arrangement (e.g. see ref 23 in FIG. 11), and the control arrangement 15a, 15b may thus be configured to adjust the wires/lines 20a, 20b accordingly to ensure that the tension in the lines/wires 20a, 20b does not exceed one or more predefined thresholds and e.g. lies within bounds defined by a lower and an upper threshold.

Additionally, the mutual distance DIS2 between the first and second steering wire guides 13a, 13b may be in embodiments of the invention be configured to be adjusted in response to a rotation RO of the frame arrangement 10 as e.g. previously described.

In general, it is to be understood that the present invention is not limited to the particular examples described above but may be adapted in a multitude of varieties within the scope of the invention as specified in e.g. the claims.

The invention claimed is:

1. A lifting device (10) for lifting and controlling the horizontal orientation of wind turbine components, during installation.

2. A system (1) for lifting and controlling the horizontal orientation and/or position of a wind turbine component, during installation and/or dismounting of said components, wherein the system comprises:
a crane boom arrangement (3) and one or more lifting lines (3a) guided by said crane boom arrangement (3) for lifting said component,
a lifting device (10) according to claim 1 wherein the crane connection arrangement (11) is connected to said one or more lifting lines (3a),
a rotation control arrangement (15a, 15b) configured to adjust the orientation in a horizontal plane of the component (90) lifted by means of said lifting device (10) by adjusting one or more of said steering wires (20a, 20b), and a guiding arrangement (4) connected to said crane boom arrangement (3), wherein said steering wires (20a, 20b) are connected to said guiding arrangement (4) and extend from the guiding arrangement (4) in a direction towards the lifting device (10) with a mutual angle (a1) between the steering wires (20a, 20b).

3. A system (1) according to claim 2, wherein the rotation control arrangement (15a, 15b) is configured to adjust said one or more of said steering wires (20a, 20b) to rotate (RO) the frame arrangement (12) in the horizontal plane, and wherein said relative displacement between the frame arrangement (12) and one or both of the first and second steering wire guides (13a, 13b) is configured to be provided to control the mutual angle (a1) between the steering wires (20a, 20b) when said frame arrangement (12) is rotated (RO) in a horizontal plane.

4. A system (1) according to claim 2, wherein said first and a second steering wire guides (13a, 13b) are connected to and supported by said frame arrangement (12), and wherein one or both of the first and second steering wire guides (13a, 13b) are configured to be displaced relative to said frame arrangement (12) to control said mutual angle (a1) between the steering wires (20a, 20b), and/or
wherein said first and/or second steering wire guides (13a, 13b) are configured to provide that the angle (a1) between the steering wires is within an angle range between 50° and 130°, preferably between 60° and 120°, such as between 75° and 105°, preferably between 85° and 95° when the frame arrangement (12) is rotated.

5. A system (1) according to claim 2, wherein the angle (a1) between the steering wires (20a, 20b) is controlled by adjusting the mutual distance (DIS2) between the first and second steering wire guides (13a, 13b).

6. A system (1) according to claim 2, wherein the mutual distance (DIS2) between the first and second steering wire guides (13a, 13b) is:
configured to be increased in response to an increase in the distance (DIS1) between the crane boom arrangement (3) and/or guiding arrangement (4), and the lifting device (10),
configured to be reduced in response to a decrease in the distance (DIS1) between the crane boom arrangement (3) and/or guiding arrangement (4) and the lifting device (10), and/or
configured to be adjusted in response to a rotation (RO) of the frame arrangement (10).

7. A system (1) according to claim 2, wherein the first and second steering wire guides (13a, 13b) are configured to be displaced along a longitudinal frame part (12a, 12b) of said frame arrangement (12), where said longitudinal frame parts (12a, 12b) are configured to extend in a direction away from a centre part (19) of said lifting device (10), preferably in a substantially horizontal direction, when the lifting device (10) hangs from said one or more lifting lines (3a).

8. A system (1) according to claim 2, wherein said guiding arrangement (4) comprises one or more guiding wires (4) extending in the longitudinal direction of a crane boom of said crane boom arrangement (3), wherein said guiding arrangement (4) preferably comprises a single guiding wire (4), wherein both of said steering wires (20a, 20b) are preferably connected to said single guiding wire by means of a connection (40).

9. A system (1) according to claim 2, wherein said system (1) comprises a displacement control system (22, 17a, 17b) for controlling the displacement of one or more of the first and/or second steering wire guides (13a, 13b) relative to said frame arrangement (12), wherein said displacement control system comprises:
one or more displacement arrangements (17a, 17b) arranged at said lifting device and configured to provide a displacement of the respective, steering wire guide (13a, 13b) relative to the frame arrangement (12), and
a displacement arrangement controller (22) comprising control circuitry configured to provide control signals to the displacement arrangements (17a, 17b), preferably based on one or more input signals,
wherein said displacement control system preferably is configured to provide a displacement of said first and/or second steering wire guides (13a, 13b) in response to an adjustment of one or more of said steering wires (20a, 20b) by means of the rotation control arrangement (15a, 15b).

10. Use of a lifting device (10) according to claim 1 in a system for lifting and controlling the horizontal orientation and/or position of a wind turbine component, during installation and/or dismounting of said component, wherein the system comprises:
a crane boom arrangement (3) and one or more lifting lines (3a) guided by said crane boom arrangement (3) for lifting said components, wherein the crane connection arrangement (11) is connected to said one or more lifting lines (3a),
a rotation control arrangement (15a, 15b) configured to adjust the orientation in a horizontal plane of the component (90) lifted by means of said lifting device (10) by adjusting one or more of said steering wires (20a, 20b), and
a guiding arrangement (4) connected to said crane boom arrangement (3), wherein said steering wires (20a, 20b) are connected to said guiding arrangement (4) and extend from the guiding arrangement (4) in a direction towards the lifting device (10) with a mutual angle (a1) between the steering wires (20a, 20b).

11. A method of lifting and controlling the horizontal orientation and/or position of a wind turbine component, during installation and/or dismounting of said components, by means of a lifting device (10), wherein the lifting device comprises:
a crane connection arrangement (11) to be connected to one or more lifting lines (3a) of a crane arrangement,
a frame arrangement (12) connected to said crane connection arrangement (11), a first and a second steering wire guide (13a, 13b) for guiding steering wires (20a, 20b) placed on the crane arrangement (11), and
a component connection arrangement (30) connected to said frame arrangement and configured to be connected directly or indirectly to the component, wherein a guiding arrangement (4) is connected to a crane boom arrangement (3), and wherein said steering wires (20a, 20b) are connected to said guiding arrangement (4) and extend from the guiding arrangement (4) in a direction towards the lifting device (10) with a mutual angle (a1) between the steering wires (20a, 20b), and so that the steering wires (20a, 20b) are guided by said first and second steering wire guides (13a, 13b), wherein the method comprises the steps of:
connecting one or more lifting lines (3a) to the crane connection arrangement (11) so that the lifting device (10) hangs from the one or more lifting lines (3a),
connecting said component (90) to be lifted to said component connection arrangement (30),
hoisting and/or lowering said component (90) by operating said one or more lifting lines (3a), and/or rotating (RO) the frame arrangement (12) in a horizontal plane by means of said one or more steering wires (20a, 20b) guided by the steering wire guides (13a, 13b),
wherein a relative displacement between one or both of the first and second steering wire guides (13a, 13b) and said frame arrangement (12) is provided due to and/or in repose to a rotation (RO) of the frame arrangement (12) by a rotation control arrangement (15a, 15b), and/or wherein a relative displacement between one or both of the first and second steering wire guides (13a, 13b) and said frame arrangement (12) is provided in response to a change in distance (DIS1) between the lifting device (10) and the guiding arrangement (4), wherein—the first and second steering wire guide (13*a*, 13*b*) are connected to and supported by the frame arrangement (12).

\* \* \* \* \*